(12) United States Patent
Herring et al.

(10) Patent No.: US 7,383,191 B1
(45) Date of Patent: Jun. 3, 2008

(54) METHOD AND SYSTEM FOR PREDICTING CAUSES OF NETWORK SERVICE OUTAGES USING TIME DOMAIN CORRELATION

(75) Inventors: David Herring, Berkshire (GB); John Carroll, Irving, TX (US); Rehan O'Grady, London (GB); Neil Coleman, West Midlands (GB); Felix Marks, London (GB)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 09/724,025

(22) Filed: Nov. 28, 2000

(51) Int. Cl.
*G06Q 10/00* (2006.01)
(52) U.S. Cl. .......................... 705/1; 379/111
(58) Field of Classification Search .................. 702/34, 702/179, 181, 182, 183, 184, 185; 705/7, 705/11, 400, 1; 724/25, 37, 39, 47, 48; 379/111; 395/200
See application file for complete search history.

(56) References Cited

U.S. PATENT DOCUMENTS

| | | |
|---|---|---|
| 3,855,456 A | 12/1974 | Summers et al. |
| 3,906,454 A | 9/1975 | Martin |
| 4,135,662 A | 1/1979 | Dlugos |
| 4,410,950 A | 10/1983 | Toyoda et al. |
| 4,438,494 A | 3/1984 | Budde et al. |
| 4,503,534 A | 3/1985 | Budde et al. |
| 4,503,535 A | 3/1985 | Budde et al. |
| 4,517,468 A | 5/1985 | Kemper et al. |
| 4,545,013 A | 10/1985 | Lyon et al. |
| 4,568,909 A | 2/1986 | Whynacht |
| 4,585,975 A | 4/1986 | Wimmer |
| 4,591,983 A | 5/1986 | Bennett et al. |
| 4,622,545 A | 11/1986 | Atkinson |
| 4,634,110 A | 1/1987 | Julich et al. ................. 371/11 |

(Continued)

FOREIGN PATENT DOCUMENTS

EP    0 209 795    1/1987

(Continued)

OTHER PUBLICATIONS

"Optimal Sequence Testing Scheme for VLSI Circuits": IBM Technical Disclosure Bulletin, Apr. 1, 1987, vol. 29, No. 11, pp. 4711-4713.*

(Continued)

*Primary Examiner*—John W. Hayes
*Assistant Examiner*—Shannon S. Saliard
(74) *Attorney, Agent, or Firm*—Seth H. Ostrow; Dreier LLP

(57) ABSTRACT

Methods and systems are described for predicting the likely causes of service outages using only time information, and for predicting and the likely costs of service outages. The likely causes are found by defining a narrow likely cause window around an outage based on service quality and/or service usage data, and correlating service events to the likely cause window in the time domain to find a probability distribution for the events. The likely costs are found by measuring usage loss and duration for a given point during an outage and using cost component functions of the time and usage to extrapolate over the outage. These cause and cost predictions supply service administrators with tools for making more informed decisions about allocation of resources in preventing and correcting service outages.

33 Claims, 18 Drawing Sheets

U.S. PATENT DOCUMENTS

| | | |
|---|---|---|
| 4,648,044 A | 3/1987 | Hardy et al. |
| 4,727,545 A | 2/1988 | Glackemeyer et al. |
| 4,817,092 A | 3/1989 | Denny |
| 4,823,345 A | 4/1989 | Daniel et al. |
| 4,866,712 A | 9/1989 | Chao |
| 4,881,230 A | 11/1989 | Clark et al. |
| 4,914,657 A | 4/1990 | Walter et al. |
| 4,932,026 A | 6/1990 | Dev et al. |
| 4,935,876 A | 6/1990 | Hanatsuka |
| 5,107,497 A | 4/1992 | Lirov et al. |
| 5,109,486 A | 4/1992 | Seymour |
| 5,123,017 A | 6/1992 | Simpkins et al. |
| 5,125,091 A | 6/1992 | Staas, Jr. et al. |
| 5,132,920 A | 7/1992 | Bellows et al. ......... 364/551.01 |
| 5,133,075 A | 7/1992 | Risch |
| 5,159,685 A | 10/1992 | Kung |
| 5,179,556 A | 1/1993 | Turner |
| 5,204,955 A | 4/1993 | Kagei et al. |
| 5,214,653 A | 5/1993 | Elliott, Jr. et al. |
| 5,247,517 A | 9/1993 | Rose et al. |
| 5,261,044 A | 11/1993 | Dev et al. |
| 5,293,629 A | 3/1994 | Conley et al. |
| 5,295,244 A | 3/1994 | Dev et al. |
| 5,309,448 A | 5/1994 | Bouloutas et al. |
| 5,315,502 A * | 5/1994 | Koyama et al. ............... 700/79 |
| 5,321,837 A | 6/1994 | Daniel et al. |
| 5,325,518 A | 6/1994 | Bianchini, Jr. ............... 395/575 |
| 5,375,070 A | 12/1994 | Hershey et al. |
| 5,383,178 A | 1/1995 | Unverrich .................... 370/17 |
| 5,432,934 A | 7/1995 | Levin et al. |
| 5,436,909 A | 7/1995 | Dev et al. |
| 5,483,637 A | 1/1996 | Winokur et al. |
| 5,485,455 A | 1/1996 | Dobbins et al. |
| 5,491,694 A | 2/1996 | Oliver et al. |
| 5,495,470 A | 2/1996 | Tyburski et al. |
| 5,504,921 A | 4/1996 | Dev et al. |
| 5,521,910 A | 5/1996 | Matthews |
| 5,528,516 A | 6/1996 | Yemini et al. ......... 364/551.01 |
| 5,557,747 A | 9/1996 | Rogers et al. ......... 395/200.11 |
| 5,559,955 A | 9/1996 | Dev et al. |
| 5,590,120 A | 12/1996 | Vaishnavi et al. |
| 5,627,819 A | 5/1997 | Dev et al. |
| 5,646,864 A | 7/1997 | Whitney ................. 364/514 B |
| 5,649,103 A | 7/1997 | Datta et al. |
| 5,661,668 A | 8/1997 | Yemini et al. ............... 364/550 |
| 5,666,481 A | 9/1997 | Lewis |
| 5,675,741 A | 10/1997 | Aggarwal et al. |
| 5,687,290 A | 11/1997 | Lewis |
| 5,696,486 A | 12/1997 | Poliquin et al. |
| 5,706,436 A | 1/1998 | Lewis et al. |
| 5,722,427 A | 3/1998 | Wakil et al. |
| 5,727,157 A | 3/1998 | Orr et al. |
| 5,734,642 A | 3/1998 | Vaishnavi et al. |
| 5,748,098 A | 5/1998 | Grace .................... 340/825.16 |
| 5,748,781 A | 5/1998 | Datta et al. |
| 5,751,933 A | 5/1998 | Dev et al. |
| 5,751,965 A | 5/1998 | Mayo et al. |
| 5,754,532 A | 5/1998 | Dev et al. |
| 5,761,502 A | 6/1998 | Jacobs ........................ 395/614 |
| 5,764,955 A | 6/1998 | Doolan |
| 5,768,501 A | 6/1998 | Lewis |
| 5,774,377 A | 6/1998 | Eidson et al. ............... 364/550 |
| 5,777,549 A | 7/1998 | Arrowsmith et al. |
| 5,790,546 A | 8/1998 | Dobbins et al. |
| 5,791,694 A | 8/1998 | Fahl et al. |
| 5,793,362 A | 8/1998 | Matthew et al. |
| 5,812,750 A | 9/1998 | Dev et al. |
| 5,819,028 A | 10/1998 | Manghirmalani et al. ...................... 395/185.1 |
| 5,822,305 A | 10/1998 | Vaishnavi et al. |
| 5,832,196 A | 11/1998 | Croslin et al. ......... 395/182.02 |
| 5,832,503 A | 11/1998 | Malik et al. |
| 5,872,911 A | 2/1999 | Berg ..................... 395/183.19 |
| 5,872,928 A | 2/1999 | Lewis et al. |
| 5,889,953 A | 3/1999 | Thebaut et al. |
| 5,907,696 A | 5/1999 | Stilwell et al. |
| 5,940,376 A | 8/1999 | Yanacek et al. |
| 5,949,676 A * | 9/1999 | Elsley .......................... 700/79 |
| 5,949,759 A | 9/1999 | Cretegny et al. ............ 370/250 |
| 5,970,984 A | 10/1999 | Wakil et al. |
| 5,980,984 A | 11/1999 | Modera et al. |
| 5,984,178 A | 11/1999 | Gill et al. .................... 235/379 |
| 5,984,507 A * | 11/1999 | Edens ........................ 700/220 |
| 5,987,442 A | 11/1999 | Lewis et al. |
| 6,000,045 A | 12/1999 | Lewis |
| 6,003,090 A | 12/1999 | Puranik et al. |
| 6,006,016 A | 12/1999 | Faigon et al. .......... 395/185.01 |
| 6,012,152 A | 1/2000 | Douik et al. .................. 714/26 |
| 6,014,697 A | 1/2000 | Lewis et al. |
| 6,026,442 A | 2/2000 | Lewis et al. |
| 6,041,383 A | 3/2000 | Jeffords et al. |
| 6,047,279 A | 4/2000 | Barrack et al. ................ 706/60 |
| 6,049,792 A | 4/2000 | Hart et al. .................... 706/10 |
| 6,049,828 A | 4/2000 | Dev et al. |
| 6,057,757 A | 5/2000 | Arrowsmith et al. |
| 6,064,304 A | 5/2000 | Arrowsmith et al. |
| 6,064,986 A | 5/2000 | Edelman |
| 6,064,996 A | 5/2000 | Yamaguchi et al. |
| 6,084,858 A | 7/2000 | Matthews et al. |
| 6,115,362 A | 9/2000 | Bosa et al. |
| 6,131,112 A | 10/2000 | Lewis et al. |
| 6,138,122 A | 10/2000 | Smith et al. |
| 6,141,720 A | 10/2000 | Jeffords et al. |
| 6,199,172 B1 | 3/2001 | Dube et al. |
| 6,205,563 B1 | 3/2001 | Lewis |
| 6,209,033 B1 | 3/2001 | Datta et al. |
| 6,216,168 B1 | 4/2001 | Dev et al. |
| 6,219,805 B1 | 4/2001 | Jones et al. .................... 714/38 |
| 6,233,623 B1 | 5/2001 | Jeffords et al. |
| 6,243,747 B1 | 6/2001 | Lewis et al. |
| 6,255,943 B1 | 7/2001 | Lewis et al. |
| 6,324,530 B1 | 11/2001 | Yamaguchi et al. |
| 6,324,590 B1 | 11/2001 | Jeffords et al. |
| 6,336,138 B1 | 1/2002 | Caswell et al. |
| 6,349,306 B1 | 2/2002 | Malik et al. |
| 6,373,383 B1 | 4/2002 | Arrowsmith et al. |
| 6,374,293 B1 | 4/2002 | Dev et al. |
| 6,381,639 B1 | 4/2002 | Thebaut et al. |
| 6,392,667 B1 | 5/2002 | McKinnon et al. |
| 6,421,719 B1 | 7/2002 | Lewis et al. |
| 6,430,712 B2 | 8/2002 | Lewis |
| 6,437,804 B1 | 8/2002 | Ibe et al. |
| 6,483,460 B2 * | 11/2002 | Stilp et al. ................... 342/457 |
| 6,502,079 B1 | 12/2002 | Ball et al. |
| 6,510,478 B1 | 1/2003 | Jeffords et al. |
| 6,597,777 B1 * | 7/2003 | Ho .............................. 379/133 |
| 6,603,396 B2 | 8/2003 | Lewis et al. |
| 6,651,062 B2 | 11/2003 | Ghannam et al. |
| 2001/0013107 A1 | 8/2001 | Lewis |
| 2001/0042139 A1 | 11/2001 | Jeffords et al. |
| 2001/0047409 A1 | 11/2001 | Datta et al. |
| 2001/0047430 A1 | 11/2001 | Dev et al. |
| 2001/0052085 A1 | 12/2001 | Dube et al. |
| 2002/0032760 A1 | 3/2002 | Matthews et al. |
| 2002/0050926 A1 | 5/2002 | Lewis et al. |
| 2002/0075882 A1 | 6/2002 | Donis et al. |
| 2002/0184528 A1 | 12/2002 | Shevenell et al. |
| 2002/0188584 A1 | 12/2002 | Ghannam et al. |
| 2003/0110396 A1 | 6/2003 | Lewis et al. |

FOREIGN PATENT DOCUMENTS

| | | |
|---|---|---|
| EP | 0 319 998 B1 | 6/1989 |
| EP | 0 338 561 B1 | 10/1989 |

| | | |
|---|---|---|
| EP | 0 616 289 | 9/1994 |
| EP | 0 686 329 B1 | 12/1995 |
| WO | WO 89/07377 | 8/1989 |
| WO | WO 93/00632 | 1/1993 |
| WO | WO 95/20297 | 7/1995 |
| WO | WO 96/09707 | 3/1996 |
| WO | WO 97/16906 | 5/1997 |
| WO | WO 97/29570 | 8/1997 |
| WO | WO 97/37477 | 10/1997 |
| WO | WO 97/44937 | 11/1997 |
| WO | WO 98/42109 | 9/1998 |
| WO | WO 98/44682 | 10/1998 |
| WO | WO 98/52322 | 11/1998 |
| WO | WO 99/27682 | 6/1999 |
| WO | WO 00/13112 | 3/2000 |
| WO | WO 00/72183 | 11/2000 |
| WO | WO 01/86380 | 11/2001 |
| WO | WO 01/86443 | 11/2001 |
| WO | WO 01/86444 | 11/2001 |
| WO | WO 01/86775 | 11/2001 |
| WO | WO 01/86844 | 11/2001 |
| WO | WO 02/06971 | 1/2002 |
| WO | WO 02/06972 | 1/2002 |
| WO | WO 02/06973 | 1/2002 |
| WO | WO 02/45315 A2 * | 6/2002 |

OTHER PUBLICATIONS

Roemer et al: "Advanced diagnostics and prognostics for gas turbine engines risk assessment", 2000 IEEE Aerospace Conference Proceedings (Cat. No. 00TH8484) Mar. 18-25, 2000, Part vol. 6, pp. 345-353.*

Subramanian, Mani, Network Management: Principles and Practice, Addision Wesley Longman, 2000.

Lewis, Lundy, Service Level Management for Enterprise Networks, Artech House, 1999.

Integrated Network Management V: Integrated Management in a Virtual World, Proceedings of the Fifth IFIP/IEEE International Symposium on Integrated Network Management, San Diego, California, May 12-16, 1997, Lazar A. et. al, eds., Chapman & Hall, 1997.

Stevenson Douglas W., Network Management: What it is and what it isn't, Apr. 1995, http://www.sce.carleton.ca/netmanage/NetMngmnt/NetMngmnt.html (visited Aug. 30, 2004).

Network and Distributed Systems Management, Morris Sloman, Ed., Addision-Wesley, 1994.

RFC 1158—Management Information Base for network management of TCP/IP-based internets: MIB-II, Network Working Group, M. Rose, Ed., May 1990, http://www.faqs.org/rfcs/rfc1158.html (visited Aug. 30, 2004).

RFC 1157—Simple Network Management Protocol (SNMP), Network Working Group, J. Case et al., Eds., May 1990, http://www.faqs.org/rfcs/rfc1157.html (visited Aug. 30, 2004).

RFC 1156—Management Information Base for network management of TCP/IP-based internets, Network Working Group, K. McCloghrie and M. Rose, Eds., May 1990, http://www.faqs.org/rfcs/rfc1156.html (visited Aug. 30, 2004).

RFC 1155—Structure and identification of management information for TCP/IP-based internets, Network Working Group, M. Rose and K. McCloghrie, Eds., May 1990, http://www.faqs.org/rfcs/rfc1155.html (visited Aug. 30, 2004).

ISO/IEC 10164-1: 1993, Information technology—Open Systems Interconnection—Systems Management: Object Management Function.

ISO/IEC 10164-2:1993, Information technology—Open Systems Interconnection—Systems Management: State Management Function.

ISO/IEC 10164-4:1992, Information technology—Open Systems Interconnection—Systems management: Alarm reporting function.

ISO/IEC 10164-5:1993, Information technology—Open Systems Interconnection—Systems management: Event Report Management Function.

ISO/IEC 10165-1:1993, Information technology—Open Systems Interconnection—Management Information Services—Structure of management information: Management Information Model.

ISO/IEC 9595:1998, Information technology—Open Systems Interconnection—Common management information service.

ISO/IEC 9596-2:1993, Information technology—Open Systems Interconnection—Common management information protocol:Protocol Implementation Conformance Statement (PICS) proforma.

ISO/IEC 7498-4:1989, Information processing systems—Open Systems Interconnection—Basic Reference Model—Part 4: Management framework.

Gilbert R., et al., CNMGRAF—Graphic Presentation Services for Network Management, ACM 0-89791-164 (1985).

M. Gargano, et al., A Logical Data Model for Integrated Geographical Databases, IEEE (1990).

Micromuse's Netcool/Omnibus, A Cool MOM Makes It Easy, Data Communications, Jan. 1995.

* cited by examiner

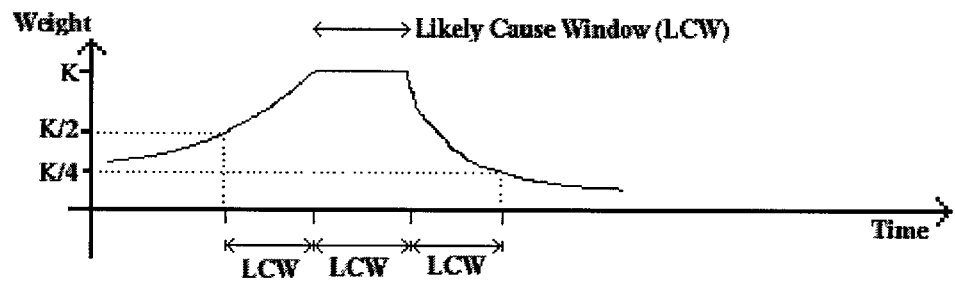
FIG. 10
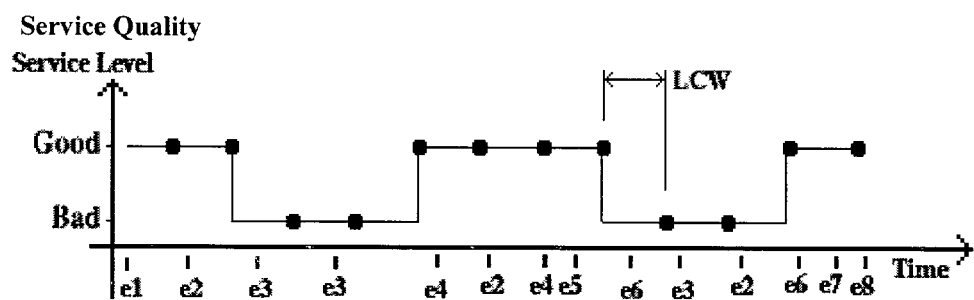
FIG. 11
| Event | T(e) | FO(e) | PO(e) | U(e) | F(e) | P(e) |
|---|---|---|---|---|---|---|
| e3 | 2.11 | 1.00 | 4 | 1 | 8.44 | 0.5072 |
| e6 | 4.00 | 0.50 | 2 | 1 | 4.00 | 0.2404 |
| e2 | 1.24 | 0.25 | 2 | 4 | 2.48 | 0.1488 |
| e5 | 2.61 | 0.50 | 1 | 1 | 1.31 | 0.0785 |
| e4 | 1.38 | 0.25 | 1 | 1 | 0.34 | 0.0207 |
| e7 | 0.07 | 0.50 | 1 | 1 | 0.03 | 0.0021 |
| e1 | 0.06 | 0.50 | 1 | 1 | 0.03 | 0.0019 |
| e8 | 0.02 | 0.50 | 1 | 1 | 0.01 | 0.0005 |
| | | | | Total: | 16.64 | 1.0000 |
FIG. 12

METHOD AND SYSTEM FOR PREDICTING CAUSES OF NETWORK SERVICE OUTAGES USING TIME DOMAIN CORRELATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

This application is related to application Ser. No. 09/476,846, now pending titled METHOD AND SYSTEM FOR EVENT IMPACT ANALYSIS, filed Jan. 3, 2000, which application is hereby incorporated herein by reference in its entirety.

BACKGROUND OF THE INVENTION

The invention disclosed herein relates to the field of fault event correlation and assessment in computerized services such as telecommunications networks or application programs. More particularly, the invention relates to methods, systems, and software for determining likely causes of service outages and assessing the costs of the service outages. The invention described herein is useful in correcting service outages, preventing future occurrences of similar service outages, and determining the appropriate level of resources which should be allocated to correct and prevent such outages.

Maintaining the proper operation of various types of computerized services is usually an important but difficult task. Service administrators are often called upon to react to a service failure by identifying the problem which caused the failure and then taking steps to correct the problem. To avoid wasting resources investigating the wrong problems, administrators must make accurate assessments as to the causes of failures. Because substantial time and resources are often required, administrators must also make accurate decisions as to when to allocate resources to the tasks of identifying problems and fixing them.

A number of tools are available to assist administrators in completing these tasks. One example is the NETCOOL® suite of applications available from Micromuse Inc., assignee of the present application, which allows network administrators to monitor activity on networks such as wired and wireless voice communication networks, intranets, wide areas networks, or the Internet. The NETCOOL suite logs and collects network events, including network occurrences such as alerts, alarms, or other faults, and then reports them to network administrators in graphical and text based formats. Administrators are thus able to observe network events on a real-time basis and respond to them more quickly. The NETCOOL suite also includes network service monitors of various types which measure performance of a network so that, among other things, network resources can be shifted as needed to cover outages.

Even knowing that events are occurring in real time, however, administrators must still make judgments as to which events are responsible for causing service failures or outages and which service outages are worth the expenditure of resources to fix. Although experienced administrators can usually make reasonably accurate judgments, it is desirable to provide additional application tools which improve the chances that these judgments are accurate.

A number of existing systems attempt to correlate events with service failures. For example, U.S. Pat. No. 5,872,911 to Berg describes a system that monitors a telecommunications network for faults and assesses fault data to determine the likely cause of the fault. The system accomplishes this by filtering and reducing the full set of fault data based on a correlation of various faults or alarms. The correlation is performed using a rules-based engine or knowledge base which determines or defines relationships among types of faults. The system then uses the filtered and reduced fault data to determine actual service impact on the network by determining whether a network outage occurred as a result of the fault. The system further determines which customers or equipment are affected by the network outage using conventional mechanisms which track network traffic.

As another example, U.S. Pat. No. 5,748,098 to Grace describes a system which uses stored historical data concerning alarms and when they occur to determine the probability of a relationship between events occurring within a window of time. The window of time is either fixed or determined with reference to the nature of the network or the stored historical data. Additional patents, including U.S. Pat. No. 5,646,864 to Whitney, U.S. Pat. No. 5,661,668 to Yemini, and U.S. Pat. No. 6,049,792 to Hart, describe still further schemes for attempting to correlate and relate network faults or alarms using expert systems, logic models, or complex causality matrices.

These patents, which are hereby incorporated by reference herein, describe systems which monitor and attempt to correlate faults in a network. However, among other things, these systems fail to take full advantage of available performance or usage data in correlating events. That is, the inventors have found that a more careful analysis of the level of usage of a service improves the correlation of events to service outages. There is therefore a need for methods and systems for accounting for service usage information among other data to improve correlation between events and service failures.

Furthermore, there is a need for improved methods and systems for helping administrators make decisions about how to prioritize outages and allocate resources in the correction or prevention of service failures. Commonly assigned application Ser. No. 09/476,846, now pending and U.S. Pat. No. 5,872,911, discussed above, describe different systems for determining the impact of a service failure on customers or users. However, these systems do not quantify the impact in a way to provide the administrator with the ability to compare the effects of outages in different, unrelated services in order to prioritize the allocation of resources, or to perform a strict cost/benefit analysis for the allocation of the resources. Improved methods and systems are thus needed to quantify the cost of a service outage in such a way as to allow the cost to be compared to costs of other service outages in services or systems which may differ in type or use.

SUMMARY OF THE INVENTION

It is an object of the present invention to solve the problems described above with existing network analysis systems.

It is another object of the present invention to improve correlation between events and outages in computerized services.

It is another object of the present invention to improve the correlation without requiring substantive knowledge of the nature of the event and its effect on the service.

It is another object of the present invention to help service administrators make better decisions about how to apply resources to correct service failures.

It is another object of the present invention to quantify the overall cost of a service outage.

It is another object of the present invention to quantify the cost in a way which allows outages in different types of services or systems to be easily compared with one another.

It is another object of the present invention predict the cost of an outage during the outage.

Some of the above and other objects are achieved by a method for analyzing a potential cause of a service change, such as a service outage or service recovery. The method involves monitoring service quality of the service and usage amount of the service, and determining a service change time window based at least in part upon a change in service quality between a first working state and a second, non-working state as well as upon a change in service usage amount. The service change time window encompasses at least part of a service outage, such as the onset or completion of the outage. As used herein, a service outage or failure is intended to include not only total failures and complete losses of service but also reductions in level of a service to a level considered to be unacceptable or requiring corrective action. The method further involves detecting an event and a time in which the event occurred, and computing a probability that the detected event caused the service change based at least in part on a relation between the event time and the service change time window.

The present invention provides a significant improvement over prior attempts to correlate faults or alarms in a number of ways. For example, in certain aspects of the present invention, three items of information are taken—service quality, service usage, and events—and they are correlated in the time domain, based only on their times. In addition, using both the service quality and service usage data to define a service change time window which is likely to contain or near the cause of a service outage the correlation between the detected event and the service outage.

The method is applicable to various types of computerized services, including: telecommunication networks such as voice or data telephony systems, wired or wireless telephony, email, or instant messaging; computer networks such as intranets, extranets, local or wide area networks, or the Internet; and application programs such as web server software, operating systems, financial system software, etc. The method may be implemented in a computer program which is stored on a computer readable medium such as a magnetic or optical disk and is executed to cause the computer to perform the method.

In some embodiments, the service quality is monitored by a service monitor which regularly polls the service to determine a binary classification of the service as either good or bad. Alternatively, the service quality monitor may identify a number of discrete states of the service, and the administrator selects which combination of the states represents a working state versus a non-working state. The service usage amount is measured by a usage meter, which may be part of the service monitor or another component, and which tracks the level of traffic, performance or usage of the service on a substantially continuous basis.

Since in these embodiments the service quality is monitored by polling, a finding of bad service at some point indicates that an outage occurred at some prior point in time after the last monitored level of good. In some embodiments, the service change time window is determined by first defining a service failure time window bounded by successive readings of good and bad service levels, and then narrowing the service failure time window based upon the service usage amount measured during that service failure time window. This combination provides a more accurate time window encompassing the outage and which more likely encompasses or correlates to the event causing the outage.

The probability that the detected event caused the service change may be computed in a number of ways. In some embodiments, one or more weighting functions are used to compute a probability distribution covering events occurring during the service change time window and within a given time period prior to the window. Although the probability distribution could include events occurring a relatively long time prior to the outage, the likelihood that these older events are responsible for the outage exponentially decreases with distance from the time window and at some point are too negligible to be considered. The weighting functions may be combined to produce a combined weighting function. Exemplary weighting functions used in various embodiments of the invention include:

- a time weighting function for each detected event which decreases exponentially with the distance between the detected event occurrence time or times and the service outage time window;
- a false occurrence weighting function for each event which decreases the probability of the event as the cause of the service outage for instances in which an event of the same type occurred outside the service change time window;
- a positive occurrence weighting function for each detected event which increases the probability of the detected event as the cause of the service change based on instances stored in a historical database in which a detected event of the same type occurred within a prior service change time window; and
- a historical weighting function for each detected event which increases the probability of the detected event as the cause of the service outage based on instances in the historical database in which a detected event of the same type was identified as having caused a prior service change, perhaps by a user or some automated mechanism.

Some of the above and other objects are achieved by method for analyzing potential causes of a service change. The method involves determining a service change time window encompassing a change of service between a first working state and a service outage, the service change being determined at least in part based on measured service usage levels. For example, a service change may be detected by detecting a step change in service usage, without the need to resort to separate service quality data. A set of events occurring within a given time prior to and during the service change time window are detected, each occurrence of an event being associated with a time at which the event occurred. A probability distribution is computed for the set of events, which probability distribution determines for each event in the set the probability that the detected event caused the service change, the probability distribution being based at least in part on relations between the time of each event occurrence and the service change time window.

Some of the above and other objects of the invention are achieved by a network monitoring system having a service monitor for monitoring quality of service on the network, a usage meter for monitoring usage of the network, an event detector for detecting network events and times at which the network events occur, and a probable cause engine, coupled to receive data from the service monitor, usage meter, and event detector. The probable cause engine sets a service outage time window based upon data received from the service monitor and usage meter, the service outage time window encompassing an occurrence of a service outage in the network. The probable cause engine further determines which of the network events detected by the event detector is the most likely cause of the service outage based at least in part on the relation between the detected network event times and the service outage time window.

Some of the above and other objects of the invention are achieved by a method for quantifying the effect of a service outage over a first period of time. The method involves monitoring or measuring levels of service usage over time, defining a cost of outage time window. The cost of outage time window includes the first time period and a second time period following the first time period. The method further involves computing a cost of the outage as the difference between the measured service usage during the cost of outage time window and service usage measured in a comparison window. The comparison window is substantially equal in time to the time of the cost of outage window and reflects a similar period of service activity as the cost of outage window, but has no service outage.

In some embodiments, the second period of time is the time in which the service usage returns or recovers from the outage to within a given percentage of a normal service usage level. This recovery should last for more than a mere instant to reflect a return to a state of relative equilibrium, as the service usage is likely to fluctuate following the restoration of service. For example, in an email system, a large number of messages may accumulate in the queue while the email system is down, and a this larger number of messages may be conveyed in a short period of time once the system is returned, resulting in very high volumes. In some embodiments, the second period of time is bounded by a maximum time, e.g., a multiple of the time of the outage.

In some embodiments, the cost of outage is computed in units of service usage. What constitutes a unit of usage depends upon the nature of the service. For example, if the service is a communication service conveying messages, such as telephony or email, the unit of usage is one or more messages. If the service is a network server providing data items such as web pages in response to requests such as from clients, the unit of usage may be a received request or data item provided by a server.

Units of usage may be normalized across different services by converting them to a value such as a monetary value, number of users, time value, or other value representing a loss resulting from not receiving the unit of usage. This may be accomplished by multiplying the units of usage by an assigned value of usage per unit. The normalized value of the service outage cost may then be used by administrators or an automated decision making program to compare costs of difference services and prioritize the allocation of resources across the services to prevent or repair service outages.

In some embodiments, the service usage is continuously monitored, including after the end of cost of outage window, and is used to measure the long term effects of the service outage. This is accomplished by computing the difference between the service usage following the cost of outage time window and a normal service usage level. If the service usage is substantially below or above the normal level following the outage, this is an indication that the outage is of the type that causes loss of use of the service, including loss of users.

Some of the above and other objects of the invention are achieved by a method for predicting a cost of an outage of a service such as during the outage itself. The method involves measuring the time duration for and service usage during the outage, and comparing the measured usage amounts to normal usage amounts measured under similar service conditions for a similar period of time where no service outage occurs, to thereby determine a usage loss amount. This usage loss amount is used to compute a predicted cost of the outage based at least upon a cost component, the cost component comprising a function of the measured time of the outage and measured usage loss amount. The predicted cost of service outage may be compared to a second predicted cost of outage value for a different service so that outages in the two services may be prioritized based on the compared costs.

In some embodiments, the cost components include a service demand cost component representing an affect on service usage based upon the duration of an outage, a customer retention cost component representing a number or percentage of customers lost due to the outage, an agreement penalty component representing penalties arising under one or more service agreements due to a service outage, and a trust loss component representing empirically collected assessments of cost due to loss of trust in the service. The service demand cost component may be computed by multiplying the measured usage loss by a usage loss curve which is a function of time duration of an outage and represents a predicted percentage usage due to an outage based on time duration of the outage. The usage loss curve may be generated using historical data derived from prior service outages.

The methods and systems of the present invention thus provide a service administrator with the ability to more accurately assess what events are likely to have caused a service outage, without the need to know very much about the nature of the events, and to make a more well informed prioritization of service outages and allocation of resources in correcting or preventing the events and corresponding outages.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 10 is a graphical representation of an exemplary time weighting function in accordance with one embodiment of the present invention;

FIG. 11 is a graphical representation of exemplary outages and events;

FIG. 12 is a table showing a probability distribution for the events shown in FIG. 11 to have caused one of the outages shown in FIG. 11;

DETAILED DESCRIPTION OF THE PREFERRED EMBODIMENTS

Embodiments of the present invention are now described with reference to the drawings in the Figures.

One goal of these embodiments is to discover the likely cause of a service outage or service recovery by identifying which event or events occurring in the service are most likely to have caused the outage or recovery. For the sake of simplicity, the following description will focus on predicting costs of service outages, but the techniques and system described herein can be applied to service recovery, as explained further below.

Figure 1:
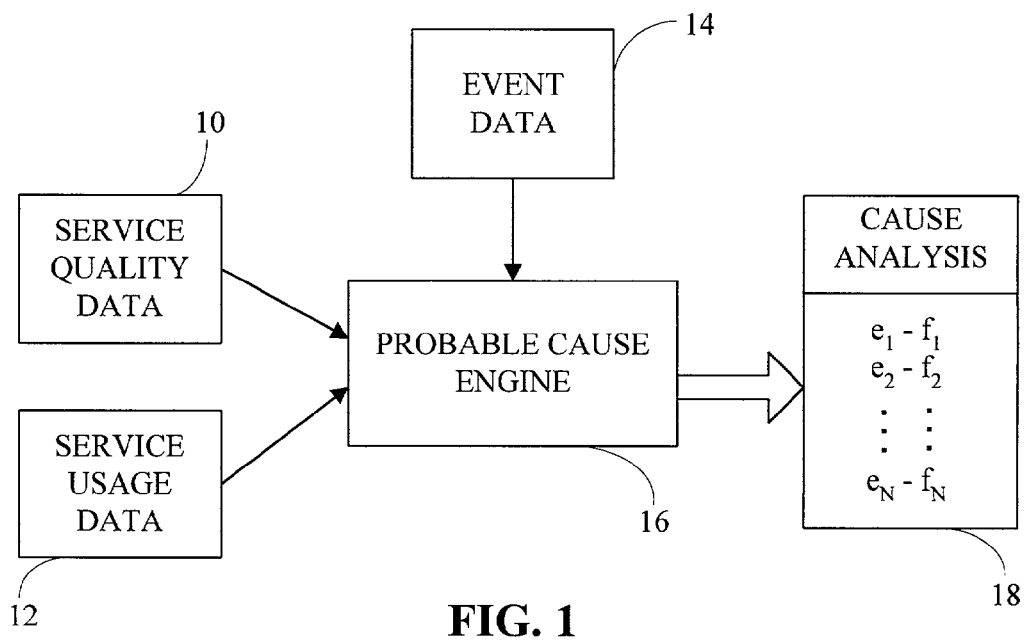
FIG. 1 is a data flow diagram showing a time-based event correlation methodology in accordance with one embodiment of the present invention.

Referring to FIG. 1, three sources of data are used to achieve this goal—service level or quality data 10, service usage data 12, and events and timestamps associated with the events 14. A probable cause engine 16 receives these three sources of data and processes them using various heuristics as described herein to build a probability distribution 18 over the events in the system, based on which events are most likely to have caused the outage. In some embodiments, the probable cause engine uses the service level data 10 and service usage data 12 to define a time window, sometimes referred to herein as a Likely Cause Window (LCW), which has a high probability of containing the event which caused the outage. The events 14 are then related to the outage based upon a time domain correlation.

By virtue of the probability distribution, the probable cause engine 16 orders the events and assigns a discrete probability to each event, so that a service administrator may more accurately assess which event caused the outage.

Event data 14 consists of a timestamp and identifier for each event. In some embodiments, the probabilistic analysis performed by the probable cause engine 16 relies only on the time and type of an event, and does not involve or require any further knowledge of what a particular event consists of or the nature of the event. For purposes of the description below, an event is often distinguished from an event type. An event generally refers to a single alarm, alert, or fault generated in or detected by the system monitoring the service. The same happening in the service may generate multiple events. An event type, on the other hand, generally refers to the network happening that generated the events. Events 14 having the same identifier all come under the umbrella of a single event type.

In addition, a specific terminology is used herein in which a set, E, is a set of events. Members of this set are referenced with double subscript notation. Several events may, for example, have the same identifier and hence all represent alarms generated by a single event type. An event type is referred to by a single subscript. Different events of a particular type are distinguished with the second subscript. For example, events $e_{11}$ and $e_{12}$ would refer to two events of type $e_1$. These events have the same identifier but different timestamps. Event $e_{11}$ represents the first chronological event of type $e_1$ in the set E, event $e_{12}$ represents the second chronological event of type $e_1$, event $e_{21}$ represents the first chronological event of type $e_2$ in the set E, and so on.

Figure 2:
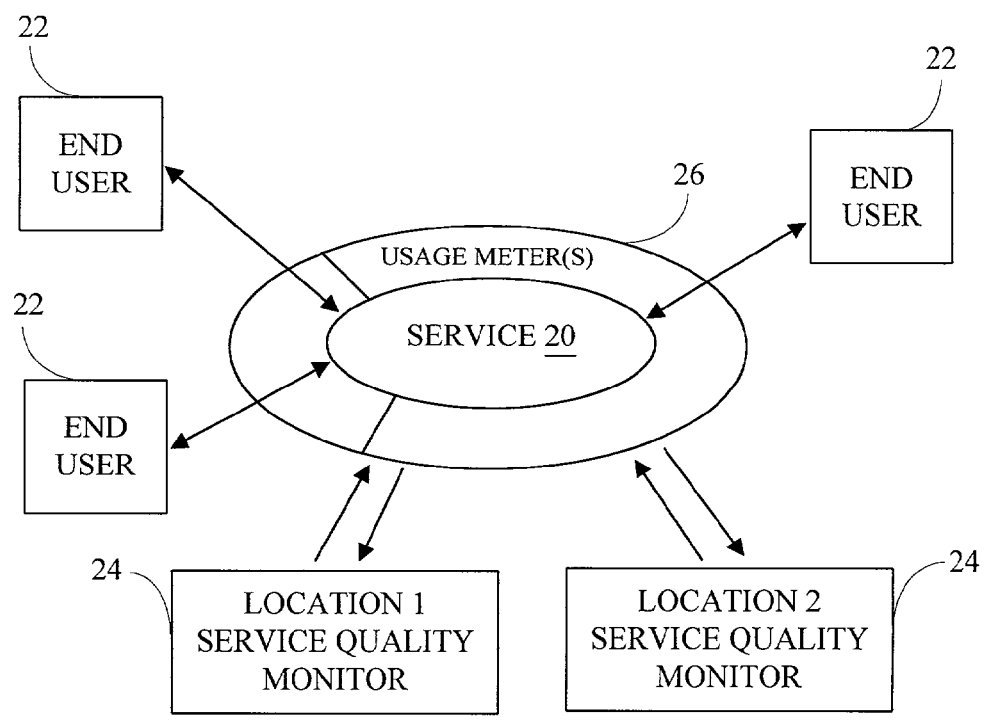
FIG. 2 is a block diagram showing a service with service level and usage monitors in accordance with one embodiment of the present invention.

The service 20 level or quality data and service usage data are collected through any conventional devices depending upon the particular service 20. For example, referring to FIG. 2, in one embodiment of the invention, a service accessed by a number of end users 22 is monitored by service level monitors 24 as well as usage meter(s) 26. As shown, the usage meter or meters measure the total amount in which the service 20 is used. This measurement will depend upon the nature of the service. For example, in a telecommunication service, the usage meter 26 measures the number of messages being conveyed by the service 20 in an hour or other time period. Such a telecommunication service 20 may include a wireless telephony system using the smart message service 20 protocol, in which the usage meter measures the number of messages conveyed over the system. Similarly, in a computer network, the amount of traffic may be measured over a given period. For a service consisting of an application software program, the usage may be measured in any appropriate manner, such as time spent, number of memory calls over time, number of documents accessed over time, etc.

The service 20 level monitors 24 monitor the status of the service on a polled basis. That is, they poll the service on a regular basis to determine whether the service is working. In some embodiments, this inquiry is binary in nature, resulting in a status of either working or non-working, sometimes referred to herein as a status of good or bad service. Alternatively, the service level monitors 24 may detect several types of service status, and an outage would be defined as desired as a transition from one status in which the service 20 considered to be working properly to a second status in which it is not providing an acceptable level of service 20. Multiple discrete service monitors 24 may be used to monitor the quality of service 20 from different locations. For example, for a network accessible from several remotely located sites, each site would have a service monitor 24 to monitor the quality of service being received at that site, while the traffic on the entire network would be measured by usage meters 26.

As explained further below, the service quality and service usage data are singly or jointly used to detect when an outage has occurred in the service. As used herein, an outage of a service is generally a period or window of time during which positive affirmation of the service being good or acceptable can not be obtained. When an outage is detected by a service monitor 24, for example, an outage time window contains one or more bad polls and is bounded at each end by two good polls. This guarantees that the outage window encompasses the entire outage incident.

Figure 3:
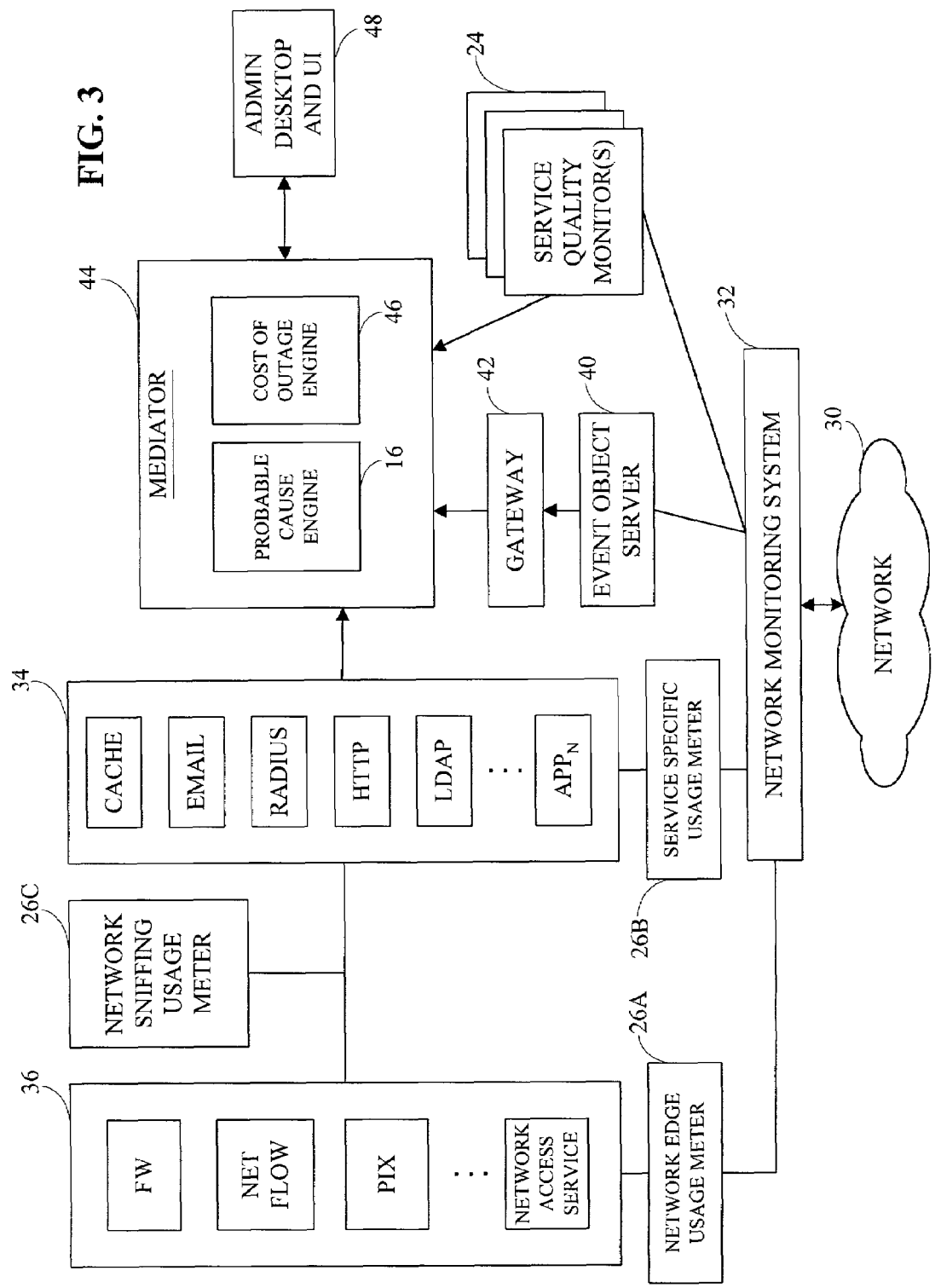
FIG. 3 is a block diagram showing a network event correlation system in accordance with one embodiment of the present invention.

One embodiment of the present invention implemented in a computerized network environment is shown in FIG. 3. In this embodiment various activity on a network 30 is monitored by a network monitoring system 32, such as the NETCOOL suite available from Micromuse Inc., as described above. Other commercially available network monitoring systems 32 may be used, as would be understood by one skilled in the art. The network monitoring system 32 works in conjunction with one or more service quality monitors 24, such as Internet Service Monitors, a set of active monitors which work with the NETCOOL suite to provide availability information on Internet service elements including DNS, HTTP, LDAP, POP3, RADFUS, SMTP, and TCP Port Monitoring, or NT Service Monitors, which work with the network monitoring system 32 to collect management events from a network operations center regarding Windows NT® environments.

Further, a set of service usage meters 26A, 26B, and 26C work with the network monitoring system 32 to track the amount of activity seen at different locations on the network 30. In particular, in some embodiments service specific usage meters 26B track activity on different services 34 available within the network, including, for example, a cache server, an email server, Radius, HTTP/HTML, LDAP, and other applications and services available to end users over the network 30. Other, network edge usage meters 26A measure activity in and out of the network 36 including, for example, a usage meter 26A detecting activity at a firewall monitoring application which collects security information, a usage meter 26A at Cisco Net Flow, a usage meter 26A at a PIX firewall, and others as known to those skilled in the art.

Furthermore, network sniffing usage meters 26C, sometimes referred to as snooping agents, capture and listen to packets on the network received at a network interface. Examples of conventional network sniffing usage meters include Snoop, Etherreal, and Etherfind. Etherfind, for example, examines packets traversing a network interface and outputs a text file describing the traffic. In the file, the text describing a single packet contains values such as protocol type, length, source, and destination. Further packet filtering can be done on the basis of protocol, e.g., IP, ARP, RARP, ICMP, UDP, TCP, and filtering can also be done based on the source, destination addresses as well as TCP and UDP port numbers.

Events are detected by the network monitoring system 32 through probes or similar conventional mechanisms and are stored in an event object server 40. The object server is an object-oriented data repository where information on events is stored, viewed and managed. Events are stored as objects on the server 40 which can be more easily manipulated for processing. A gateway 42 allows a mediator program suite 44 to share the event data stored in the object server 40. The mediator program suite 44 includes the probable cause engine 16 as well as a cost of outage engine 46 for quantifying the effect of an outage, as described in greater detail below. An administrator desktop and user interface 48 allows a network administrator to interact with the mediator 44 and execute the probable cause engine 16 and cost of outage engine 46.

Figure 4:
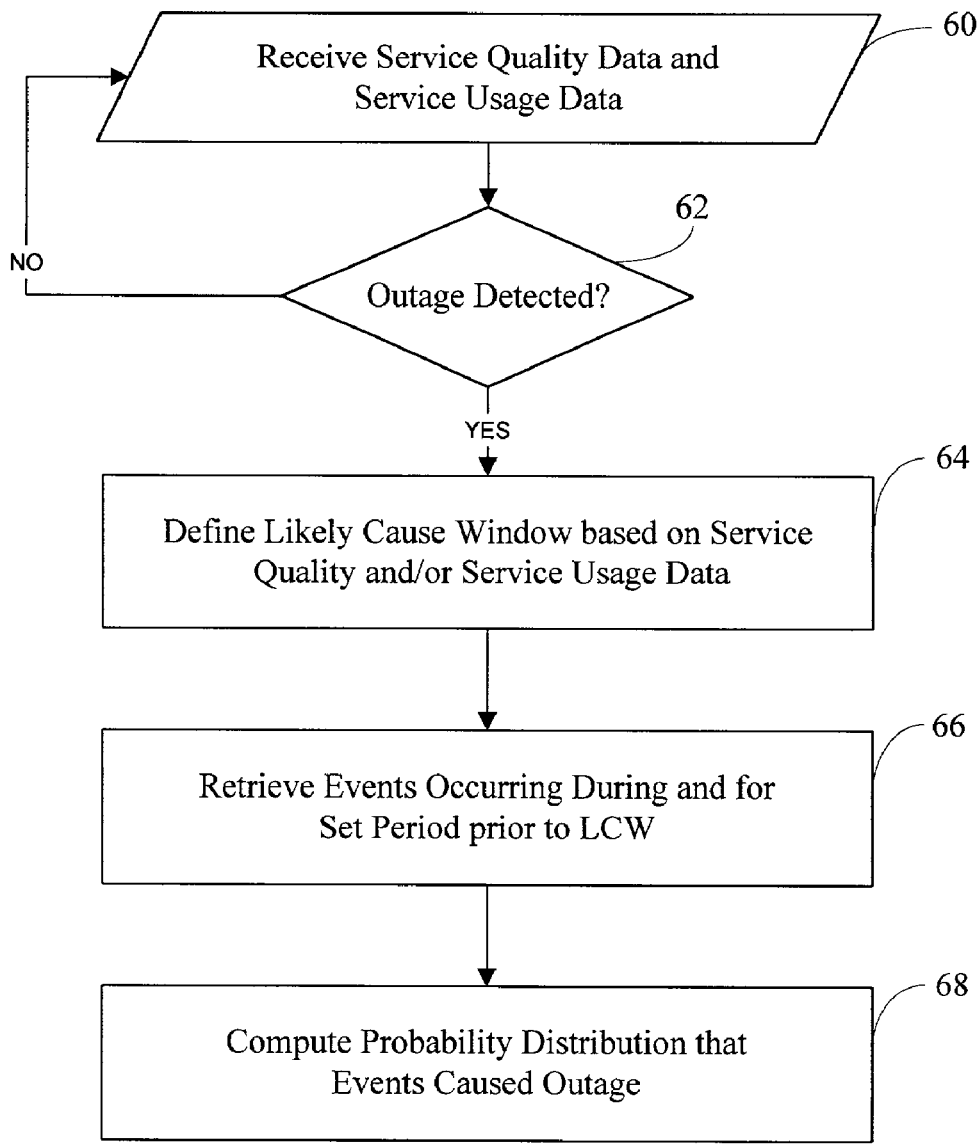
FIG. 4 is a flow chart showing a process of correlating events with a service outage in accordance with one embodiment of the present invention.

The operation of one embodiment of the probable cause engine 16 is now described with reference to the flow chart in FIG. 4 and the graphical diagrams in FIGS. 5-13. Referring to FIG. 4, the probable cause engine receives service quality data from service quality monitors and service usage data from the service usage meters, step 60. This received data is used to detect the occurrence of an outage, step 62. Where no outage is detected, however, the probable cause engine continues to receive service quality data, step 60. When an outage is detected, the probable cause engine defines a time window, sometimes referred to herein as the likely cause window or LCW, using the service quality data, service usage data, or preferably both, step 64. The probable cause engine then retrieves event data from the event object server for events which occurred during the defined likely cause window and for a period prior to the LCW, step 66. The events retrieved are each assumed to have a non-zero probability of having caused the outage, and it is further assumed that at least one of the retrieved events caused the outage. The engine then computes a probability distribution for the events which maps the probabilities that each event caused the detected outage, step 68. These probabilities are then associated with the events and output to the administrator in a suitable form.

Figure 5:
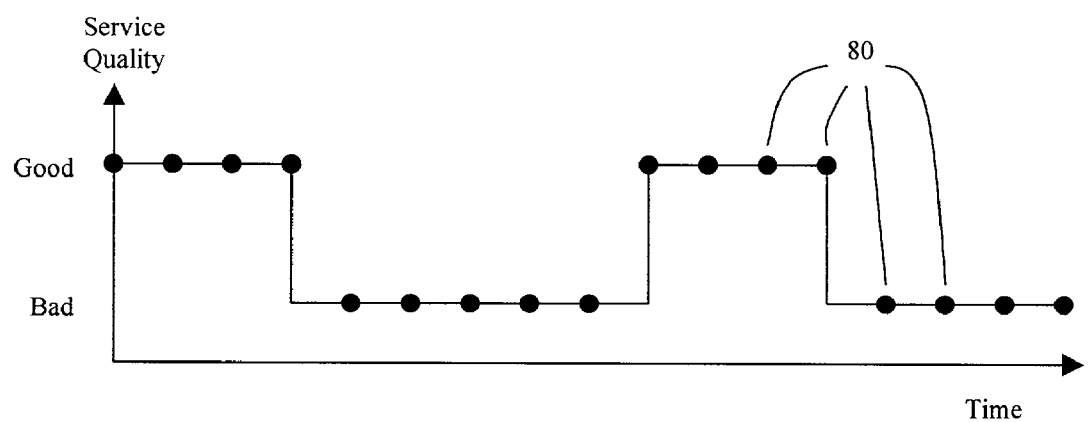
FIG. 5 is a graphical representation of an exemplary set of service quality data.
Figure 6:
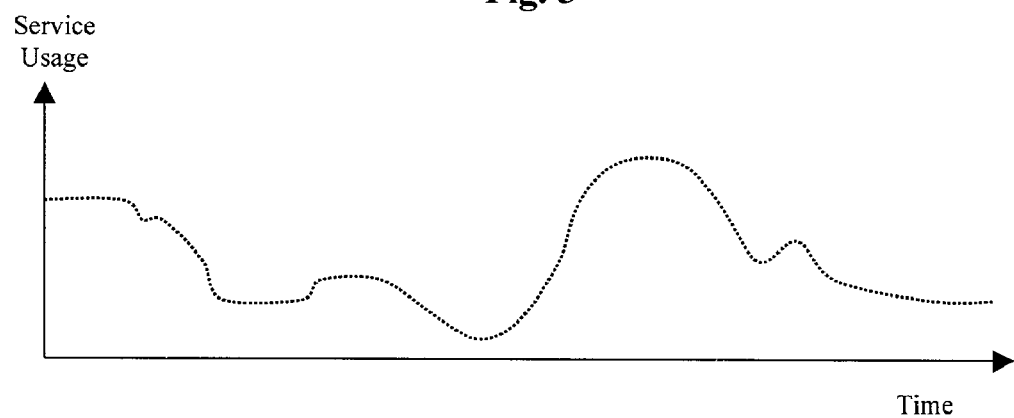
FIG. 6 is a graphical representation of an exemplary set of service usage data.

Particular implementations of steps in this methodology are now described with reference to the graphs shown in FIGS. 5-12. FIGS. 5 and 6 illustrate sample data sets for service quality and service usage, respectively. As shown in FIG. 5, service quality data consists of a series of points 80 regularly spaced at points in time. As shown, the service quality is monitored at one of two levels or states—good and bad—although a number of quality states might be detected. The classification of a quality state as good or bad is defined in the service monitor configuration by its discrete measurement classification. For purposes of simplicity in this application, it is understood that a transition from one of such states to another of such states is considered to represent a failure or outage in the service, with the definition of what loss of service constitutes an outage being a design consideration.

FIG. 6 shows service usage data consisting of a greater number of points measured on a significantly more continuous basis. The service usage data points may be measured on an entirely continuous basis, e.g., every email message conveyed or every HTTP request is counted, or sufficient samplings of usage may be taken to accurately represent the actual usage of the service.

As explained above, the service quality and service usage data are used to detect outages and define the likely cause window. For purposes of this discussion, time windows are understood to generally cover continuous subsets of the time line. In the notation used below, square brackets denote inclusion of endpoints in the subset, while round brackets mean the end point is not included. For example, given two times a and b, a window (a,b] denotes a time window starting but not including time a and ending at and including time b. In addition, for an event e, and a window, W, the notation e∈W indicates that the timestamp associated with event e falls within the window W.

Figure 7:
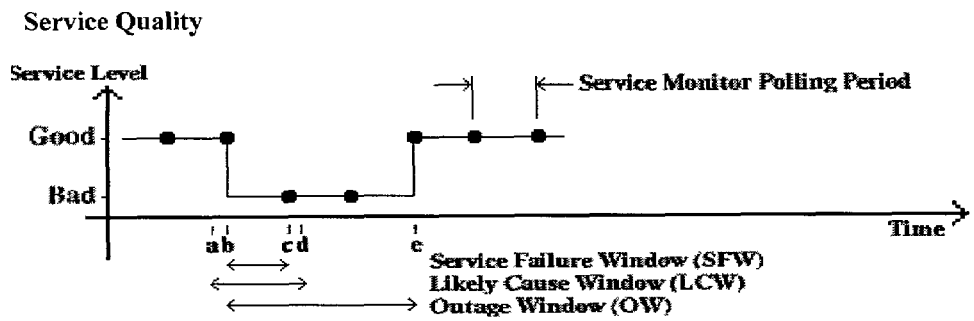
FIGS. 7-9 are graphical representations of techniques for defining a likely cause window using service level or service usage data in accordance with embodiments of the present invention.
Figure 8:
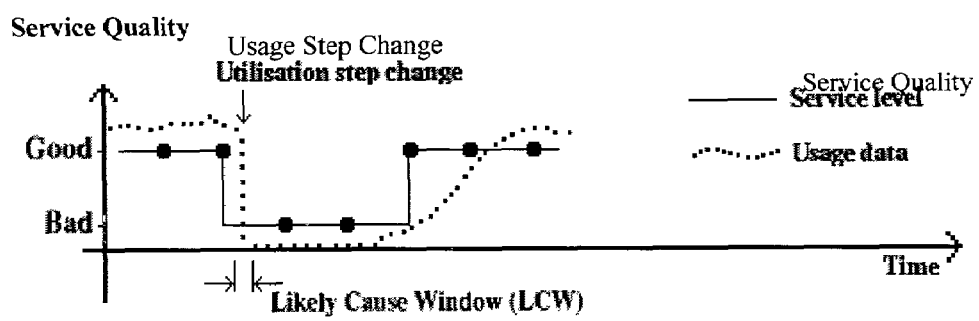

FIGS. 7 and 8 illustrate two ways in which outages are detected and the likely cause window is defined. One method of detecting an outage is through the service quality data received from a service monitor. As illustrated in FIG. 7, when a poll of the service monitor registers as bad for the first time following one or more pollings of good quality, the probable cause engine interprets that the service went bad at some stage between the current bad poll and the previous good poll. The time window between these two polls is defined as the service failure window or SFW. In the diagram in FIG. 7, the SFW is the set (b,c]. The time period between two readings of good in the service quality data in which one or more bad quality readings are monitored is defined as the outage window. In FIG. 7, the outage window is the set (b,e). As described in greater detail below, the outage window is used among other things by the cost of outage engine to predict the cost of the outage and to quantify the cost of the outage in terms which may be compared to other service outages for purposes of prioritizing the application of resources in response to the outages.

In the absence of further information, the probable cause engine defines the LCW as the SFW plus a small, preset time tolerance consisting of the windows [a,b] and [c,d]. The LCW thus represents [a,d] in the diagram in FIG. 7. Alternatively, the time tolerances are set to zero, in which case the LCW=the SFW.

Alternatively, the probable cause engine detects an outage using only the service usage data, without necessarily resorting to the service quality data. In this embodiment, illustrated in FIG. 8, the engine detects a usage step change and verifies based on the step change whether the service has gone bad. To detect a usage step change, the probable cause engine detects a changepoint in a univariate time series, the time series consisting of the discrete measurements of units of usage. If a change in the service quality has already been detected by a service monitor, the SFW is defined as explained above as the period during which the service outage started. The usage step change is found in this window using an offline changepoint detection algorithm. Some such algorithms are described in Booth, N. B. and Smith A. F. M. *A Bayesian approach to Retrospective Identification of Change Points*, J: Econ., 19, (1982), which article is hereby incorporated herein by reference. If service quality data is not available, the probable cause engine analyzes the service usage data itself to detect an outage. This analysis employs an online changepoint detection algorithm. Some online changepoint detection algorithms are described in Basseville, M and Nikiforov, I.V., *Detection of abrupt Changes, Theory and Applications*, Prentice Hall, Englewood, N.J. (1993), which article is also incorporated by reference herein.

As with an outage detection based on service quality change alone, the LCW may be defined by the probable cause engine as the time window from briefly before the usage step change up to and including the step change. However the outage is detected, clearly getting a tight bound on when the actual outage occurred is important to determining which event caused the outage. The smaller the LCW, the more likely it is that the probable cause engine will be able to pinpoint the event which caused the outage. Preferably, the LCW should be the smallest time window that can reasonably be specified in which the data indicates the outage occurred.

In some embodiments, then, the probable cause engine uses the usage step change to provide a tighter bound on a SFW previously established using service quality data. As above, a service monitor detects that the service quality has gone bad. With the addition of usage data, however, the probable cause engine puts a much tighter bound on the SFW to produce a narrower LCW. This is illustrated in FIG. 8, in which the service quality data of FIG. 7 is shown in conjunction with usage data. It will be recognized by one skilled in the art that, for purposes of comparing the two types of data and graphing them together in FIG. 8 and later drawings, either or both of the service quality data and service usage data have been normalized. The probable cause engine analyzes the usage data for the time period within the SFW found through the service quality data and detects a usage data step change. The LCW is then defined as the period of the step change plus time tolerances.

Figure 9:
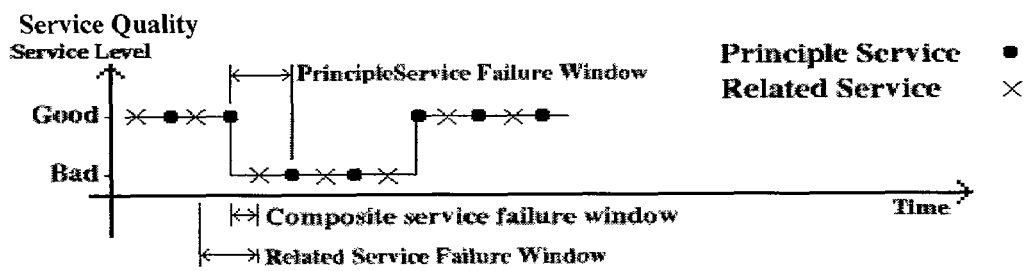

As a result, in some embodiments the definition of the likely cause window is based on the service quality and service usage data received regarding a specific service. In other embodiments, the probable cause engine considers outages in other services to achieve a more refined definition of the service failure window and ultimately the likely cause window. This is based on a theory that the cause of an outage under consideration often causes outages in other, related services. Thus, referring to FIG. 9, the engine identifies related services as services experiencing an outage whose service failure window overlaps with the service failure window for the outage under consideration. Alternatively, the engine can use stored information about the relatedness of various services, e.g., a knowledge base or expert system. The engine then superimposes the service failure window for the main or principle service with service monitor or usage meter data received regarding the related services. This results in a smaller composite service failure window, as shown in FIG. 9, and thus improves the probable cause analysis. If the probable cause engine is performing the analysis on a service which has recovered, as described below, then a similar condition can be applied to the corresponding service recovery window.

Once the probable cause engine identifies a likely cause window, it retrieves event data defining a set of events and builds a discrete probability distribution function, P, such that for any event, e, the probability that this event caused the service outage is P(e). The probability distribution, P, is based on heuristic observations of cause and effect. While many suitable heuristics will accomplish the task, four heuristics are described below, one for each criterion included in the model. In some embodiments, each heuristic can be considered on its own. Alternatively, two or more of these four heuristics are incorporated by means of mathematical weighting functions. A probability is assigned to each event type, rather to each individual event.

A first heuristic is a time weighting function T(e). This function reflects the heuristic that events in the outage window are much more likely to have caused the service outage than events outside it. Indeed, the probability assigned to events outside the outage window should decay as we move further away from the outage window.

A second heuristic is a false occurrence weighting function FO(e). This function reflects the heuristic that if an event appears many times in the retrieved set of events E, while the service was good, this event is less likely to have caused the outage. The more times an event has occurred outside of any outage window, the less probability is assigned to it.

A third heuristic is a positive occurrence weighting function PO(e). This function reflects the heuristic that the more previous outage windows an event has appeared in, the greater the probability that it has caused the current outage. The use of this heuristic requires the storage of event and outage data for reuse in later analyses.

A historic or user input weighting function U(e) reflects information provided by users of the system in the past, as stored in a database. If a user of the system has, in the past, associated a previous outage with a particular event, then this event is assigned a much higher probability. The more times an event has been associated with previous outages (by a user), the higher the probability is assigned to it.

An overall weighting function F(e) is defined as follows:

$$F(e)=T(e)*FO(e)*PO(e)*U(e)$$

In building the distribution, the probable cause engine computes the distribution such that the sum of all the probabilities for each of the different events is 1, i.e., if the set of events, E, contains n events, $e_1, \ldots, e_n$, then Sum(P(e1), ..., P(en))=1. The engine accomplishes this by discounting each of the individual weights by the sum of all the weights. Thus an event, e, has probability $$P(e) = \frac{F(e)}{\sum_{i=1}^{n} F(e_i)}$$

And as required, $$\sum_{i=1}^{n} P(e_i) = 1$$

Exemplary weighting functions used by the probable cause engine are now described. As will be understood by one skilled in the art, other weighting functions may be used within the spirit of the present invention to achieve a probabilistic time domain correlation of events and outages.

For the time weighting function, a certain constant weighting, K, is assigned to events inside the LCW. The function models an exponential decay in the weighting assigned to events, decreasing as events occur further away from the LCW. Let $e_{ij}$ be an event, and let [a,d] define the LCW on a timeline. Let t be the minimum absolute distance from the event $e_{ij}$ to an endpoint of the LCW. If $e_{ij}$ is in the LCW, then t=0. $T(e_{ij})$ is thus defined as follows:

$T(e_{ij})=K$ If $a \leq \text{timestamp}(e_{ij}) \leq b$ $T(e_{ij})=K*2^{-t/(d-a)}$ If timestamp$(e_{ij})<a$ $T(e_{ij})=K*2^{-2t/(d-a)}$ If timestamp$(e_{ij})>b$ This choice of $T(e_{ij})$ assigns a weighting of K/2 to an event occurring at time a−|LCW|, and a weighting of K/4 to an event occurring at time b+|LCW|. The time weighting function for an event of a given type is then defined as the maximum over all the events of that event type, or $T(e_i)=\max_j(T(e_j))$ A resulting time weighting function having exponential decay is illustrated in FIG. 10.

For the positive occurrence weighting function, defining posOcc(e) as the number of previous occurrences of events of this type inside LCWs, the function may be defined as follows:

PO(e)=1 if posOcc(e)=0

PO(e)=2 if posOcc(e)=1

PO(e)=4 if posOcc(e)≧2

An alternative definition of this function is:

PO(e)=1 if posOcc(e)=0

PO(e)=posOcc(e)*1.5 if posOcc(e)>0

For the false occurrence weighting function, defining negOcc(e) as the number of previous occurrences outside any outage windows, i.e., during periods of good service uninterrupted by outages, the false occurrence weighting function can be defined as:

FO(e)=1 if negOcc(e)=0

FO(e)=1/2 if negOcc(e)=1

FO(e)=1/4 if negOcc(e)≧2

An alternative definition of this function is:

FO(e)=1 if negOcc(e)=0

FO(e)=1/(negOcc(e)*1.5) if negOcc(e)>0

For the historic or user input weighting function, defining userPrevSelected(e) as the number of times events of this type have previously been selected by a user as having caused an outage of this service, the function may be defined as U(e)=1 if userPrevSelected(e)=0

U(e)=userPrevSelected(e)*4 if userPrevSelected(e)>0

Thus, using these exemplary weighting functions, the probability distribution is performed in the time domain, relying only on the temporal relation of events to the likely cause window containing the outage. The invention thus advantageously avoids the need to take into account of the nature of an event, but only needs to consider its timestamp and identifier. As will be recognized by one skilled in the art, this information and previous user knowledge may be incorporated to add more sophisticated weighting to the probability distribution performed by the probable cause engine. For example, the engine may account for where on the network an event occurred or on which type of device.

The understanding of the invention will be enhanced through an example. The service quality data and event data for the example is illustrated in the diagram in FIG. 11. The probable cause engine is concerned with the second of the two service outages shown in the Figure, and is trying to find the most probable cause for this second outage. The set of events, E, contains eight event types (event types $e_1$-$e_8$) and fourteen instances of events. The engine retrieves stored data showing that a user previously nominated event type $e_2$ as the cause of a previous outage of this service. Applying the functions provided above, the probable cause engine determines a probability distribution as shown in the table in FIG. 12, where the event types are ordered on the probability of having caused the outage. The table in FIG. 12 also shows how the different weighting functions have influenced the probability assigned to each event type.

Figure 13:
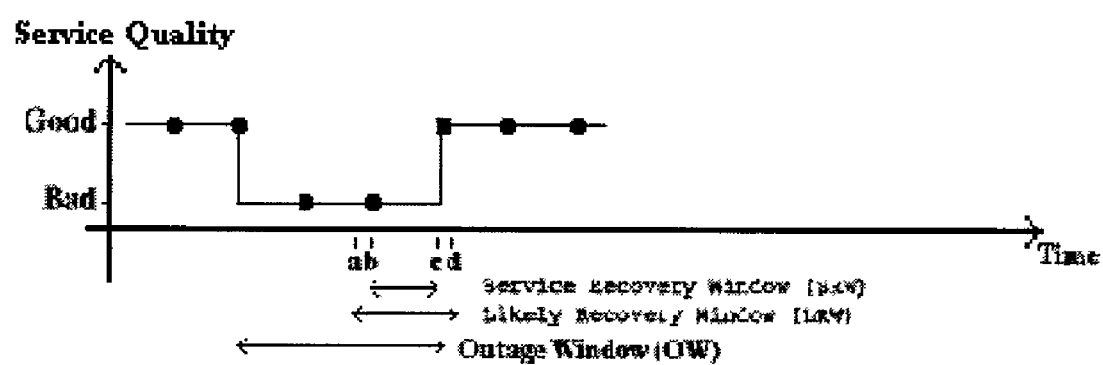
FIG. 13 is a graphical representation of a technique for defining a likely cause window for a service recovery using service level or service usage data in accordance with one embodiment of the present invention.

The probable cause engine can also be used in a similar manner to that previously described to identify the resolution of a service and predict its likely cause. To predict service resolution a service quality change is detected by a service monitor and/or a usage change showing the service changing from a non-working state such as an outage to a good status. From this, a service recovery window (SRW) is defined, as illustrated in FIG. 13. A likely recovery window (LRW) is initially defined as the SRW plus a small preset time tolerance, or using any of the other techniques for leveraging service usage data as described above. Then, in a similar manner as previously described for service failure, the LRW can be refined based upon current usage data for the service and sympathetic services which have overlapping LRW's. A series of weighting functions can similarly be applied to the events to assign probabilities as to which event caused the service to recover.

This service recover analysis is useful, among other things, within systems which have auto-correction with discrete devices or in which changes are being made to devices independent of the knowledge of the service outage—which nevertheless are service effecting.

Using these algorithms, the probable cause engine identifies the most likely cause(s) of a service outage or service recovery. This helps network administrators identify these events as ones which should be prevented or more quickly fixed to minimize the likelihood of future outages, or to identify events which work towards correcting outages sooner to enhance the chances of a quicker service recovery. However, when outages in different services, or the events that are likely to cause them, occur at around the same time, administrators need to prioritize the outages or events to properly allocate resources. The cost of outage engine in the mediator assists the administrator in this evaluation.

The cost of outage engine, sometimes referred to herein as a costing engine, relies on historical service usage data for a service stored in a database accessible to the mediator. The cost of outage engine analyzes the usage which takes place over a window of time which incorporates a service outage with comparison to the usage which has taken place during a similar comparison window of time without a service outage. This comparison is used to predict or calculate a loss in service usage due to this outage. This is then recalculated as a monetary loss by applying a value to the usage of the service. This quantifies the motivational factor for fixing a current outage and the motivational factor for ensuring a previous outage is not repeated. The cost of outage engine performs its analysis during a service outage and retrospectively for a previous service outage.

Figure 14:
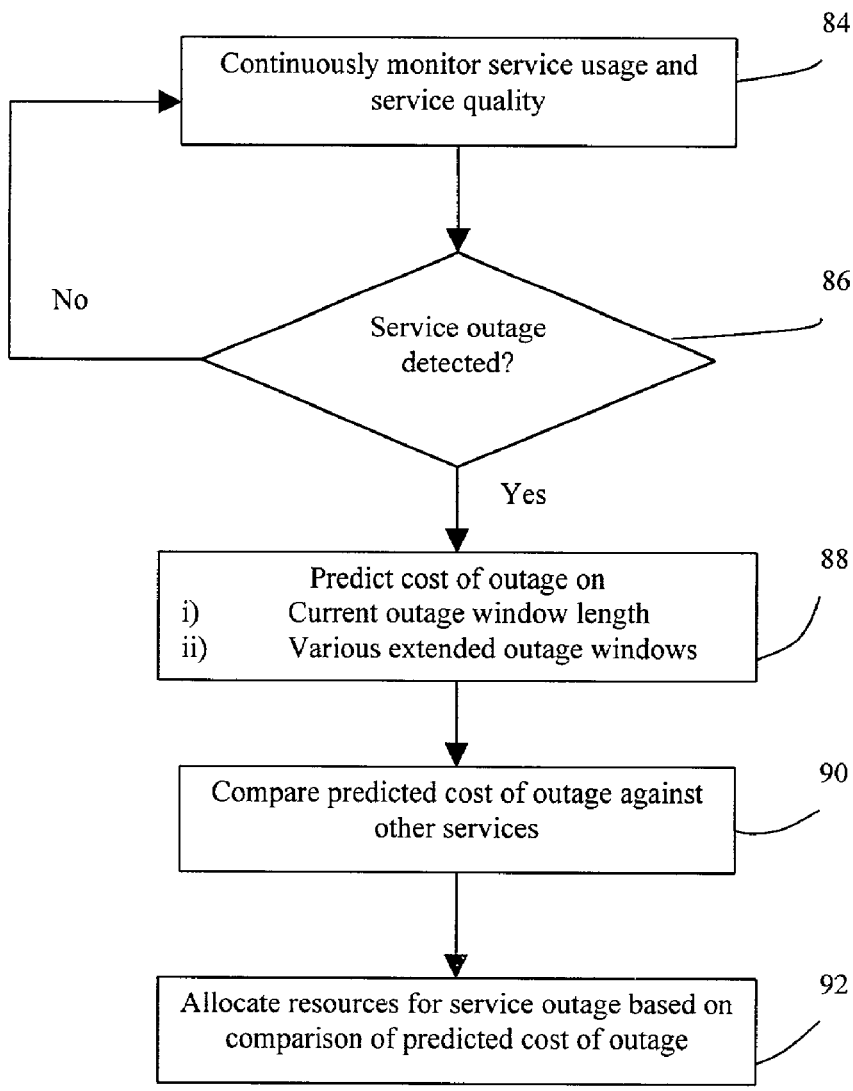
FIG. 14 is a flow chart showing a process of predicting the cost of an outage in accordance with one embodiment of the present invention.

Referring to FIG. 14, as explained above the service quality monitors regularly poll the service for quality level and the service usage meters continuously measure the activity in a service, step 84. If a service outage is detected, step 86, based on the service quality or service usage data using techniques described above, the costing engine predicts the cost of the outage based on the current outage window length, for current outages, and including various extended outage windows for completed outages, step 88. Where no service outage is detected, the service usage meters continue to measure the activity in a service, step 84. The use of window lengths to predict and compute outage costs is described in greater detail below. Once a predicted cost is computed, it is compared to the outage costs determined for other services, step 90. This comparison may then be used to prioritize outages and allocate resources to the service outages, step 92.

As a result, the costing engine both predicts costs of ongoing outages and computes costs for completed outages which have at least partially recovered. Because the prediction of outages is based in part on historical computations of outage costs, specific techniques for computing outage costs for completed outages are described first, followed by specific techniques for predicting costs of an outage during the outage.

Figure 15A:
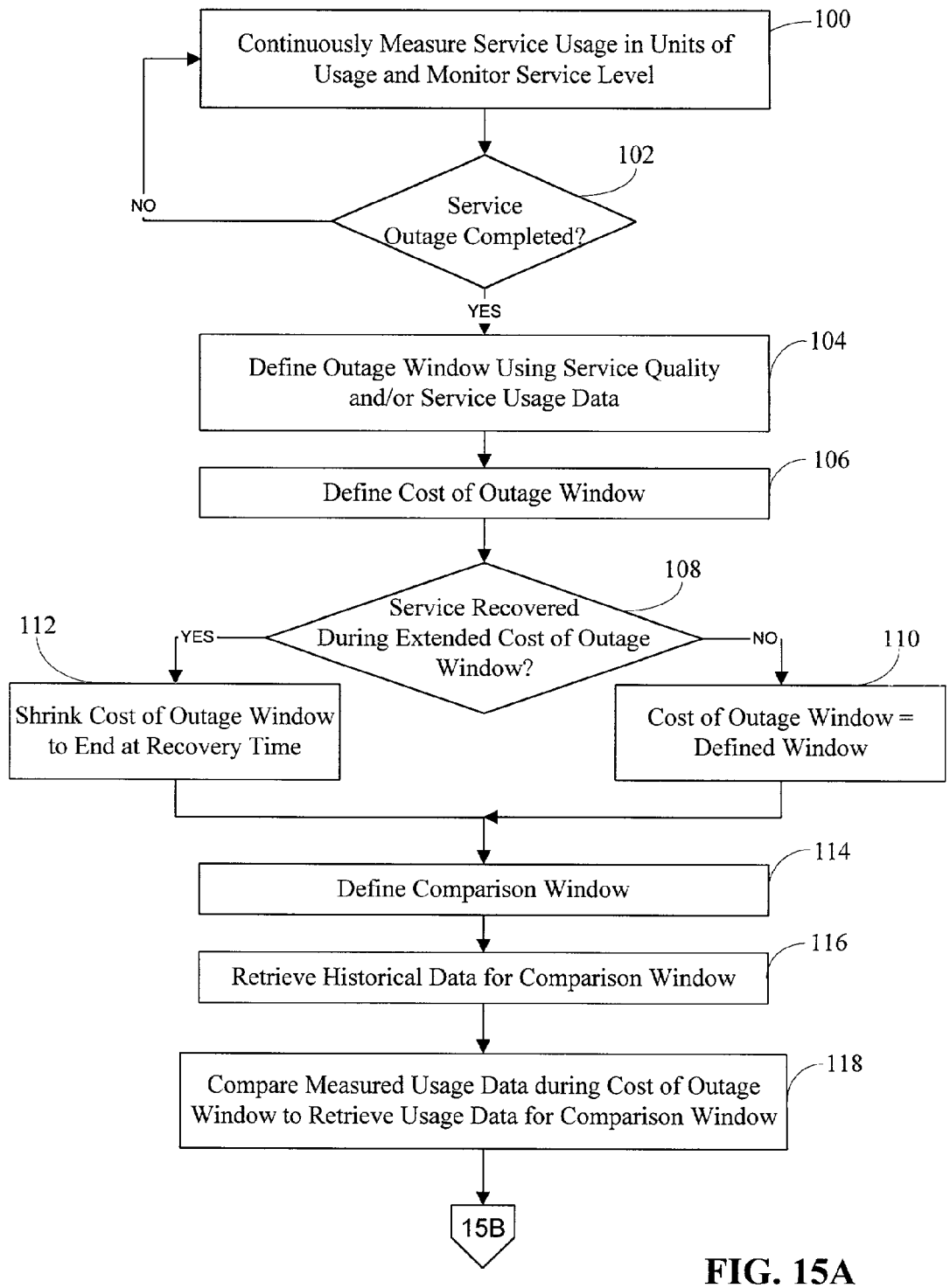
FIGS. 15A-15B contain a flow chart showing a process of quantifying the cost of a completed outage in accordance with one embodiment of the present invention.
Figure 15B:
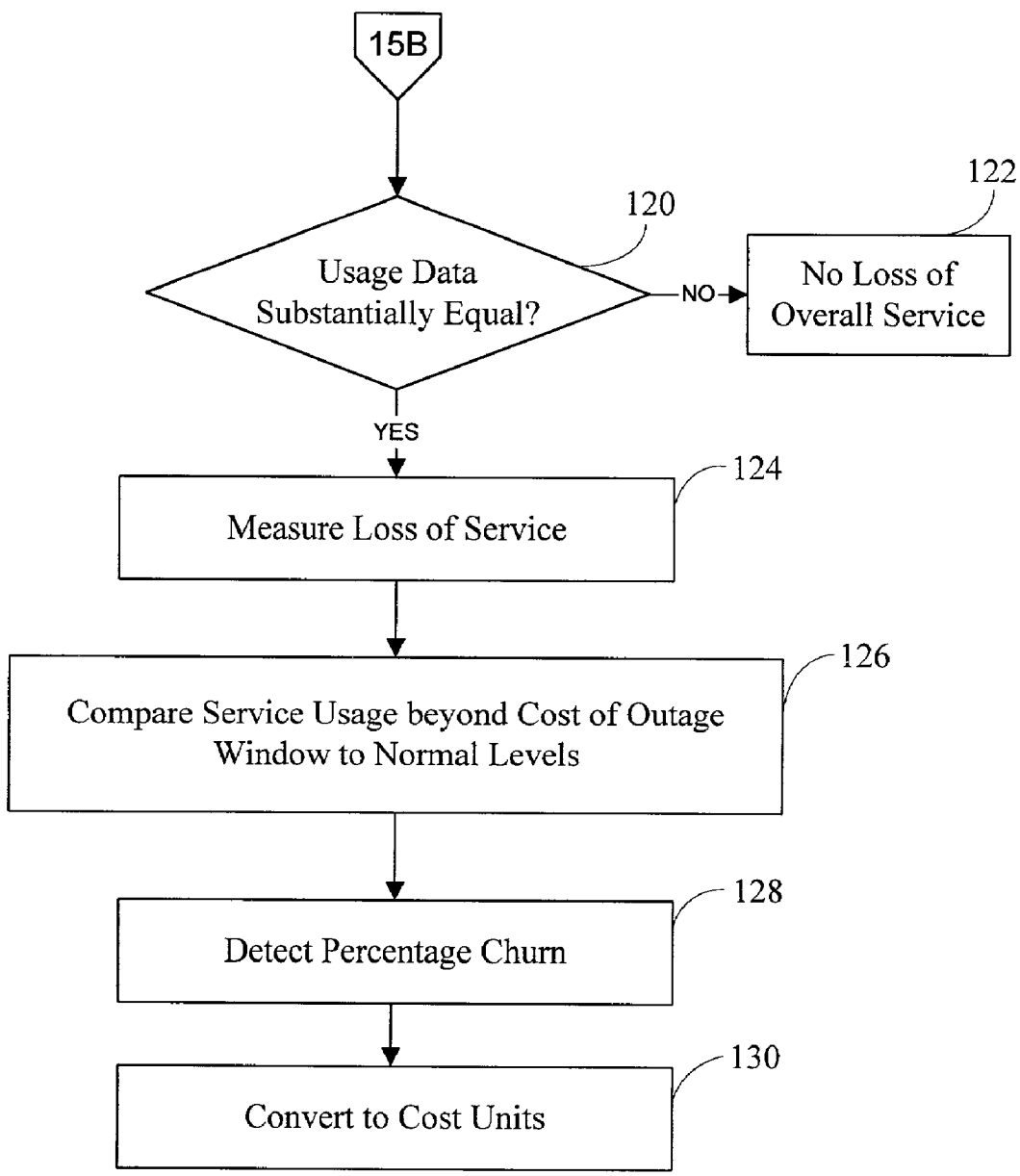

Turning first to computing outage costs, and referring to FIGS. 15A-15B, the service quality monitors regularly poll the service for quality level and the service usage meters continuously measure the activity in a service, step 100. For purposes of this aspect of the invention, the usage meters preferably measure the usage in units of usage. The unit of usage varies according to the service being measured, and is typically measured over a timed interval. For example, a unit of usage for a web server is the number of hits on the web server in a minute; for an email server, the number of emails sent and received by a company per hour; for a mobile telephone service, the number of mobile phone calls made by an individual per hour.

Where no service outage is detected, step 102, the service quality monitors continue to regularly poll the service for quality levels. If a service outage is detected as completed, step 102, using techniques described above for detecting the onset of an outage and its at least partial recovery, an outage window is defined using the service quality data and/or service usage data, step 104. For example, as described above, the outage window may be defined as the period between two service quality readings of good service with one or more bad quality readings in between. The cost of outage engine then defines an extended window which includes the outage window and a second time window, step 106. This extended window is referred to herein as a cost of outage window. The cost of outage window is the time span over which the usage data is considered for any given outage, with the goal being to analyze the usage data over a period corresponding to that which incorporates all the effects of the outage on usage patterns. The cost of outage window thus extends beyond the bounds of the outage window to pick up the recovery in usage, subsequent to the outage.

Figure 16:
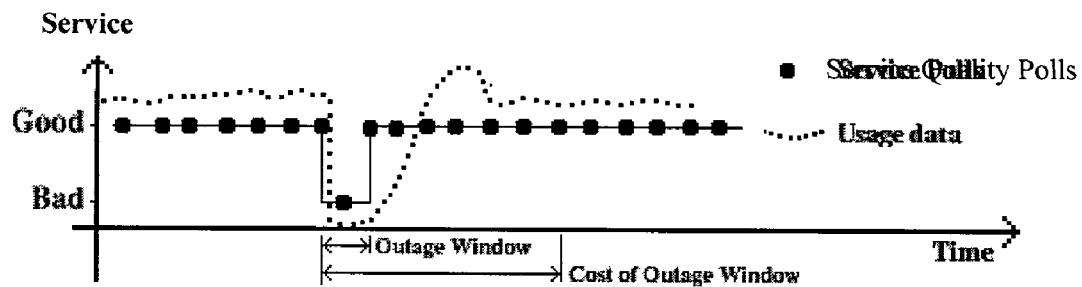
FIGS. 16-19 are graphical representations of techniques for quantifying outage costs in accordance with one embodiment of the present invention.

The cost of outage window is limited to a time frame around the outage, and in some embodiments is initially defined in terms of a time span equal to a multiple of outage windows in duration, starting at the same time as the outage. In one embodiment, the cost of outage window is set equal to four times the outage window in length, starting at the same time the outage window begins and continuing for three outage windows duration past the end of the outage window. This is illustrated in FIG. 16.

Figure 17:
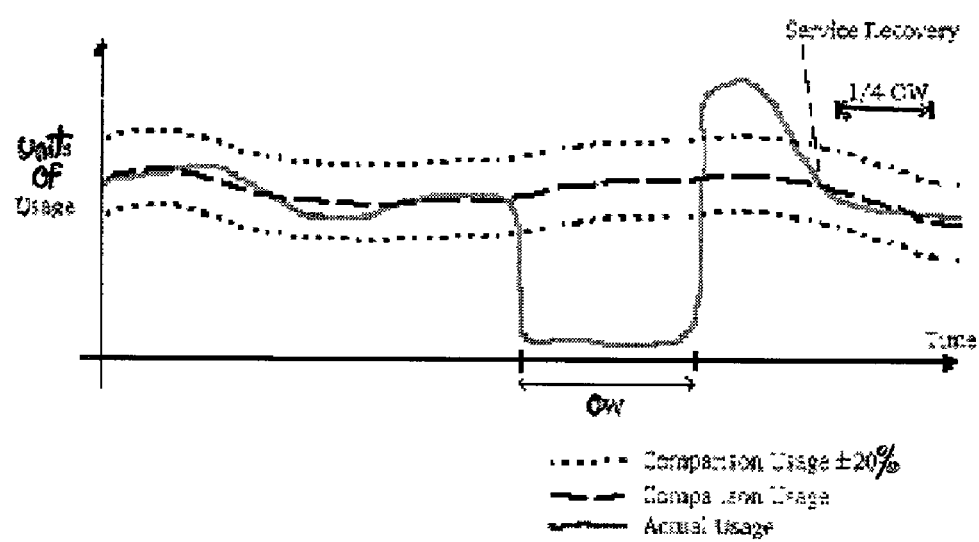

In accordance with the invention, the cost of outage window can be reduced from the full window if the time to recover occurs within this window. Thus, returning to FIG. 15A, the cost of outage engine determines whether the service recovered during the extended cost of outage window, step 108. The cost of outage engine determines a recovery as the return to "normal" service usage, with normal service varying and being service specific. In some embodiments, a recovery occurs when the units of usage are within 75%-90% of the same units of usage for the comparison window, explained further below. In other embodiments, a recovery is considered to occur when the units of usage remain within a range of plus or minus 20% of the comparison window's usage value for a sustained period equal to ¼ the outage window in length, as illustrated graphically in FIG. 17.

Figure 18:
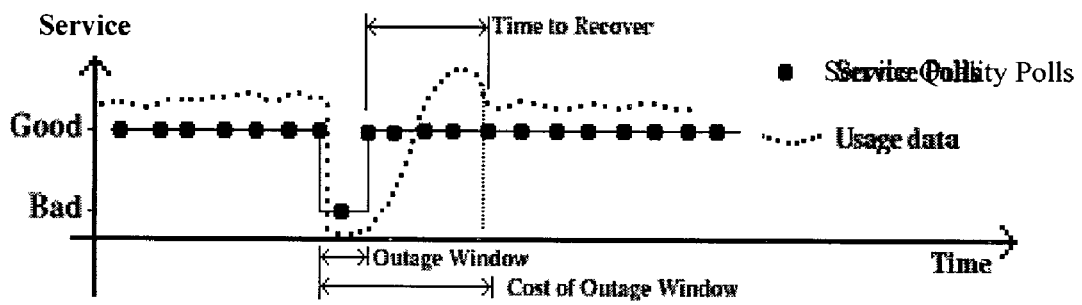

If the service usage does not recover within the cost of outage window, the cost of outage window is defined as the full, extended cost of outage window, e.g., four times the outage window, step 110. If the service usage recovers during the cost of outage window, the cost of outage window is shrunk to end at the recovery time, step 112, i.e., the cost of outage window is set at the outage window plus the time to recover. This shortening of the cost of outage window to the time to recover is illustrated in FIG. 18.

Once the cost of outage window is set, the cost of outage engine defines a comparison window, step 114, as having a time period equal in length to the cost of outage window and chosen to reflect a similar period of activity as would have occurred during the cost of outage window, had there not been an outage. The definition of the comparison window typically takes into account the cyclic nature of service access, and is typically the same period of time for the previous day/week/month or year. In most corporate services this is the previous week. The cost of outage engine then retrieves the service usage data collected and stored for the defined comparison window, step 116.

Figure 19:
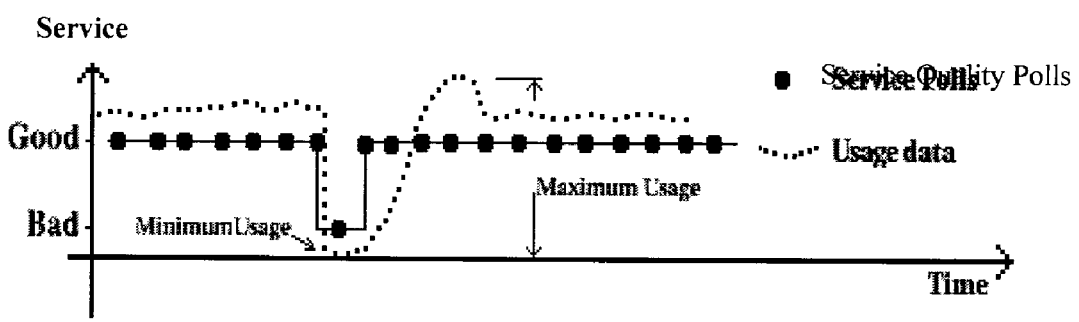

The measured usage data for the current cost of outage window is then compared to the retrieved usage data for the comparison window, step 118. This comparison yields several important items of information. For example, the cost of outage engine uses this comparison to compute a percentage peak usage, as the highest percentage units of usage recorded during the cost of outage window when calculated as a percentage against the comparison window. This can be used as a measure of demand for a service after an outage has occurred, i.e., a service usage overshoot. In addition, the cost of outage engine can compute a percentage minimum usage as the minimum units of usage recorded during a cost of outage window, computed in one embodiment as a percentage based upon the previous service usage in the comparison window. This computed comparison can be used as a measure of how complete the service outage was. These two computed values are illustrated on the usage data shown in FIG. 19.

A primary purpose of comparing the service usage data in the cost of outage window is to determine the effect of the outage on overall service and users. Thus, returning to FIG. 15B, the cost of outage engine compares the usage data in the two windows to determine whether any loss of usage occurred, step 120. This comparison is performed as the difference over the cost of outage window compared the comparison window. If the difference is zero or =negligible, the cost of outage engine determines that loss of service usage occurred, and that the service made a full recovery, step 122. Otherwise, the engine computes the loss of service, step 124.

In addition, the cost of outage engine analyzes the usage data at the instance at the end of the cost of outage window to normal levels as represented in some embodiments by the levels depicted in the comparison window, step 126, and determines the difference, step 128. This difference in actual and expected service usage at the end of the cost of outage window, sometimes referred to herein as percentage churn, is considered as a measurement of the long term effect of this outage. For example, this computed difference may be used as an indication of the loss of users to the service, perhaps because of the increased difficulty in accessing the service or lost opportunity. The units of usage in the percentage churn is converted to a number of users by dividing the usage units by a conversion factor representing a number of usage units per user. This calculated number of users may then be converted to cost by multiplying the number of users by a factor representing a set cost per user.

In order to make the loss of usage valuable as a tool to compare various types of service outages, the loss of usage and related computed values must be normalized against different services. This is accomplished by applying a value of usage weighting, where the value of usage represents, for example, the monetary loss to an organization for not achieving a given unit of usage. This may vary as a function of time, the individual or group attempting that unit of usage, etc. The cost of usage is computed, step 130, by multiplying the loss of usage by a set value of usage represents the monetary cost of the outage. Once the usage values are normalized, the cost of outage engine can compare the costs of two or more outages, for example, outages which may be overlapping, and prioritize them based on cost.

Figure 20:
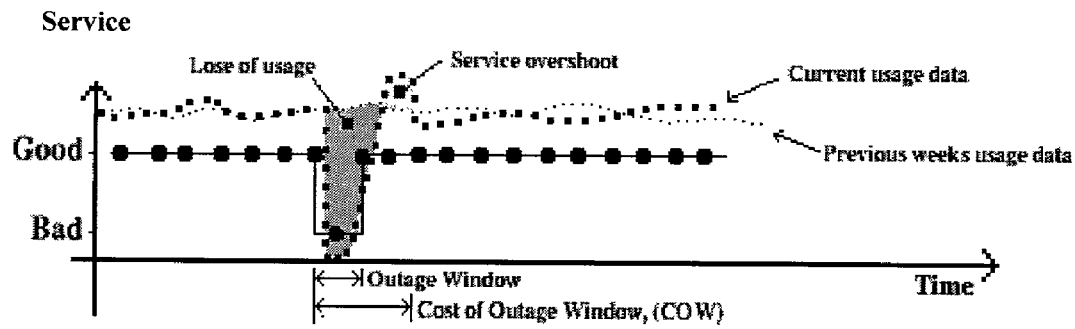
FIGS. 20-22 are graphical representations of exemplary cost of outage analyses performed in accordance with embodiments of the present invention.

This aspect of the invention would be better understood by the application of this methodology to several examples of service failure. In the first example, a momentary (e.g., less than one minute) loss of service is detected for a corporate email service. As shown in FIG. 20, the time to recover defines and shortens the cost of outage window, and there is a service overshoot as a result of the pent up demand caused by a small time of outage. One can infer a stickiness for different services in the likelihood of a user returning to use the service after a service outage. Many factors effect the stickiness of a service, such as alternative options, importance of service to user, etc. Ideally, from a service usage perspective, a service overshoot should equal the loss of usage area, meaning that effectively there was zero loss in service usage as a result of this small service outage. There is no percentage churn as the time to recover defines the cost of outage window.

Figure 21:
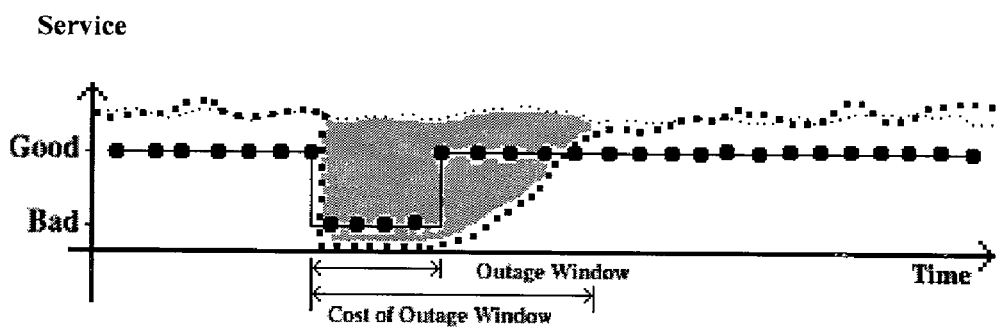

In a second example, a corporate web service fails for a medium period (e.g., less than three hours). As illustrated in FIG. 21, the cost of outage engine finds a definite loss in usage of the service, showing that any intended usage of the service during the outage has not been carried forward to when the service was restored. However the usage has recovered to show no overall percentage churn.

Figure 22:
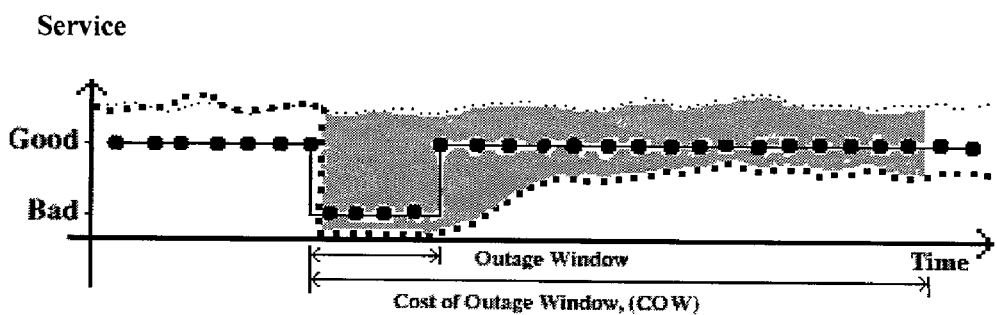

In a third example, an e-commerce web service fails for a relatively long period (e.g., one day). As illustrated in FIG. 22, the cost of outage engine finds effects of the outage lasting beyond the cost of outage window, giving a percentage churn value of approximately 50%.

As described herein, the cost of an outage is thus determined based on three basic factors—the type of service, the length of the outage window, and the time the outage occurred.

The description turns now to techniques used by the cost of outage engine for predicting the total cost of an outage during the outage based on a given outage length. This cost prediction may be used, among other things, to assess the priority of allocating resources to fix this outage. In some embodiments, the prediction of service outage cost is based on the results of a combination of outage costing components. Each costing component is a function that returns a cost when given an outage length among other possible variables. Each costing component model a particular way an outage can cost money.

In some embodiments, the costing components include the following:

a component modeling service demand behavior in relation to the length of service outage, covering the short to medium term effects of a service outage and derived from empirical observation, represented herein as $C_d$;

a component modeling level of customer retention in relation to the length of outage, represented herein as $C_r$;

a component modeling penalty clauses in service level agreements ($C_p$); and a component modeling loss of trust in the service or the company providing the service, based upon historical or empirical data, represented herein as $C_t$.

Each costing component produces a monetary cost using some or all of the following data: length of outage, usage levels at time of outage, historical usage trends, and empirical knowledge. The total monetary cost C is a sum of the component costs:

$$C(\text{outage}) = C_d(\text{outage}) + C_r(\text{outage}) + C_p(\text{outage}) + C_t(\text{outage})$$

Figure 23:
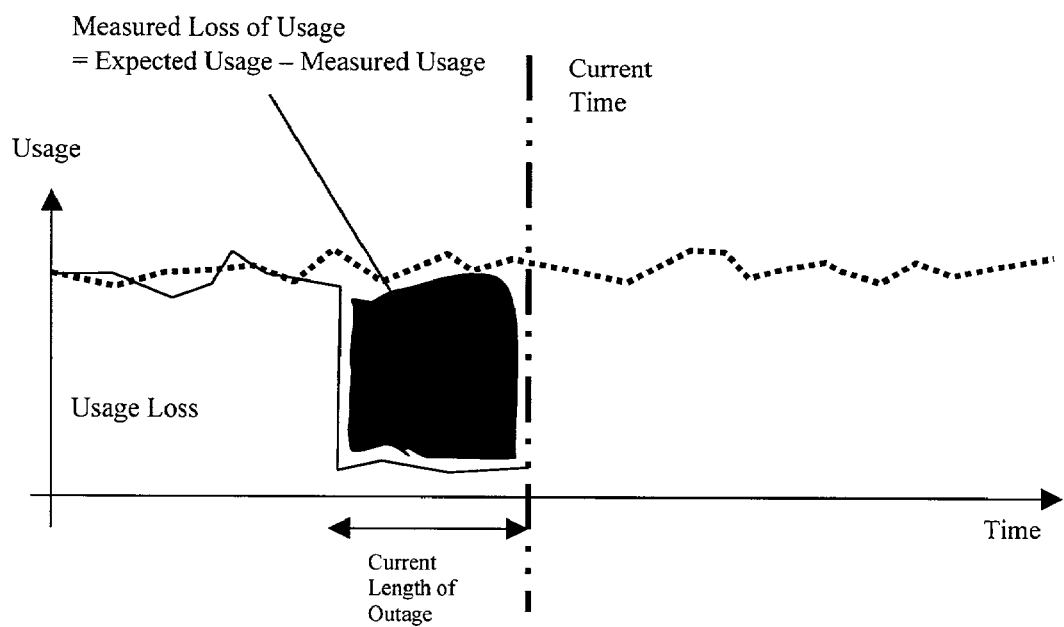
FIGS. 23-24 are graphical representations of techniques for predicting the cost of an outage during the outage in accordance with embodiments of the present invention.
Figure 24:
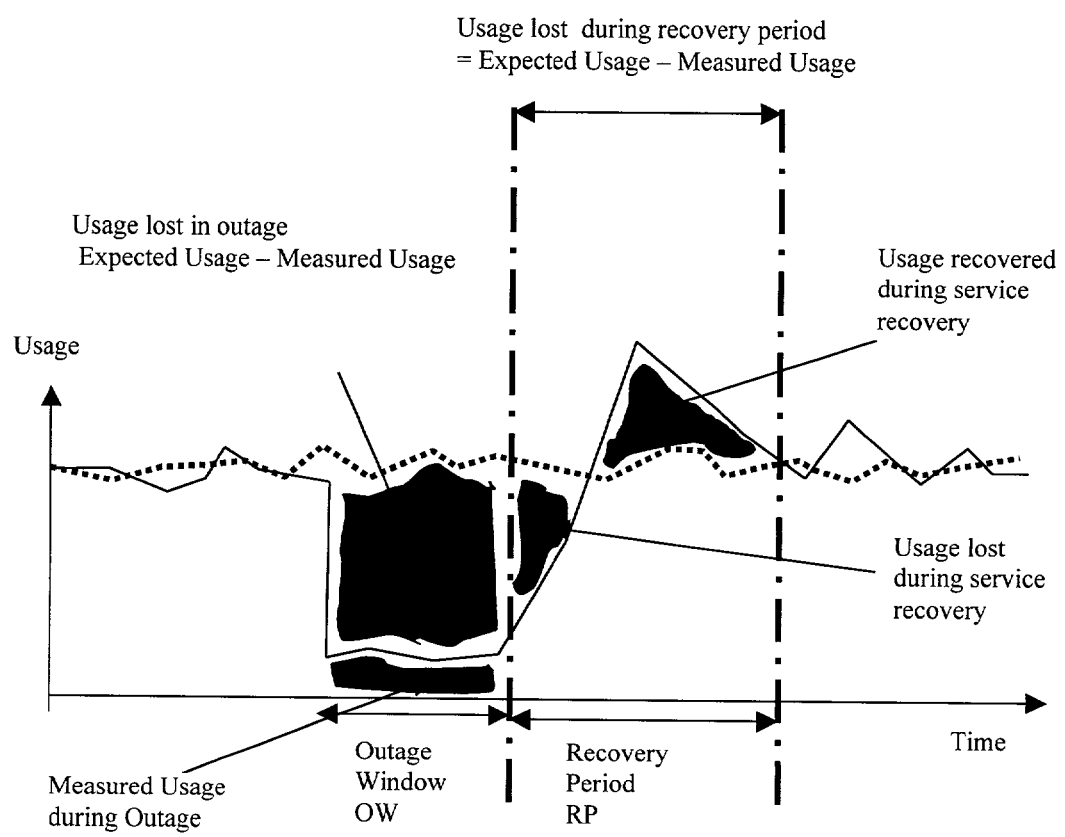

The Service Demand component embodies how the length of outage affects the short to medium term usage of a service. The two diagrams in FIGS. 23 and 24 illustrate the anatomy of an outage. The measured usage during an outage determines the severity of the outage. A complete outage results in no measured usage. Usage measured during an outage is treated as fulfilled demand, and the usage loss is measured as the difference between expected or normal usage as determined, for example, by service usage during a comparison window, and the measured usage, as shown in FIG. 23. The service demand component aims to derive a cost for all usage loss attributable to the given, current outage. The loss of usage includes usage lost in the outage window as well as predicted usage lost and regained during the recovery period, as shown in FIG. 24.

The costing engine computes the service demand cost component using a Usage Loss Curve. For purposes of this discussion, it should be understood that usage loss refers to the absence of usage, either measured or projected, as compared to usage measurements for a comparable period, and total usage loss for an outage refers to the combined usage loss from both the outage window and the recovery period.

Figure 25:
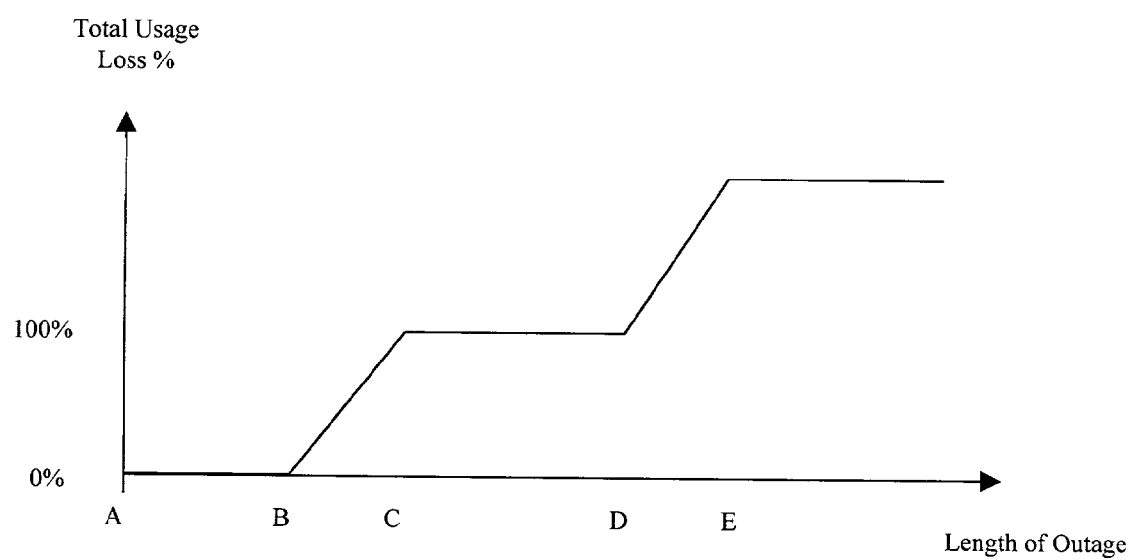
FIG. 25 is an exemplary usage loss curve as a function of time for use in predicting the cost of an outage in accordance with one embodiment of the present invention.

An example Usage Loss Curve is shown in FIG. 25. The horizontal axis represents outage window length, that is, the measured duration of the outage. The vertical axis represents total usage loss as a percentage of usage loss in the outage window. In FIG. 25, the vertical axis plots 100*(total usage loss/usage loss in outage window). This allows the predicted total usage loss for an outage in progress to be derived from the measured loss in usage and the current length of the outage. For this prediction the final outage length is taken to be the current outage length. This method is also used to predict the costs of an outage when the outage is not expected to finish at the time the prediction is made. Modeling such a scenario relies on the assumption that level of usage in the outage window will remain constant from the last measured usage value to the projected end of the outage window.

In the exemplary, typical service demand curve shown in FIG. 25, the letters A-E on the length of outage axis denote inflection points and are used to illustrate some of the features of a Usage Loss curve. To point A, outage length is zero, and no outage has occurred. From points A-B—0% usage loss—all usage missed during outage is regained post outage. From points B-C—0-100% usage loss—outage affected usage—some usage lost during outage is not recovered. From points C-D—100% usage loss—all usage missed during outage is lost. From points D-E—100-200% usage loss—all usage missed during outage is lost and outage causes post usage to be affected.

During an outage, the costing engine estimates cost of the outage using the service demand curve and the Usage Loss curve. In some embodiments, the engine uses the following formula:

$$C_d(\text{outage}) = (\text{usage lost in comparative usage window up to time } O_L) \times F_U(O_L) \times (\text{cost unit multiplier}),$$

Wherein $O_L$ is the length of the outage, which may be the length of the outage to date or the length of the outage at some future point; and $F_U$ is the function represented by the Usage Loss Curve.

Usage Loss Curves for service instances and types may be derived from previous outage analyses. For each previous outage of a service two variables are extracted: total usage loss as a percentage of usage loss during the outage window, and length of the outage window. Outage data from a series of outages may be transformed into a Usage Loss Curve using a local regression model such as Lowess, as described in W. S. Cleveland, *Visual and Computational Considerations in Smoothing Scatterplots by Locally Weighted Regression*, Computer Science and Statistics: Eleventh Annual Symposium on the Interface, pages 96-100, Institute of Statistics, North Carolina State University, Raleigh, N.C., 1978, which is incorporated herein by reference.

In some embodiments the transformation of outage information into a Usage Loss Curve is improved by applying usage patterns to the outages. These are used to better determine the amount of usage lost. Usage patterns have two components:

Method to identify pattern—expressed as a set of rules.

Method to calculate usage loss percentage, i.e., total usage lost as a percentage of the usage lost during the outage, which is expressed as a equation.

Both methods make use of the following set of functions and values:

OW—outage window length $T_S$—outage start $T_E$—outage end $C_{USAGE}(T_1, T_2)$—the expect usage between points $T_1$ and $T_2$ based on comparative usage data $S_{USAGE}(T_1, T_2)$—the usage between points $T_1$ and $T_2$ seen in the current usage data.

A number of usage patterns are identified and defined on the basis of observations of human interaction with a service during the outage recovery period. These usage patterns are described with reference to FIGS. 26-28. In other embodiments patterns may be used that model the behavior of Internet protocols and hardware during outages.

Figure 26:
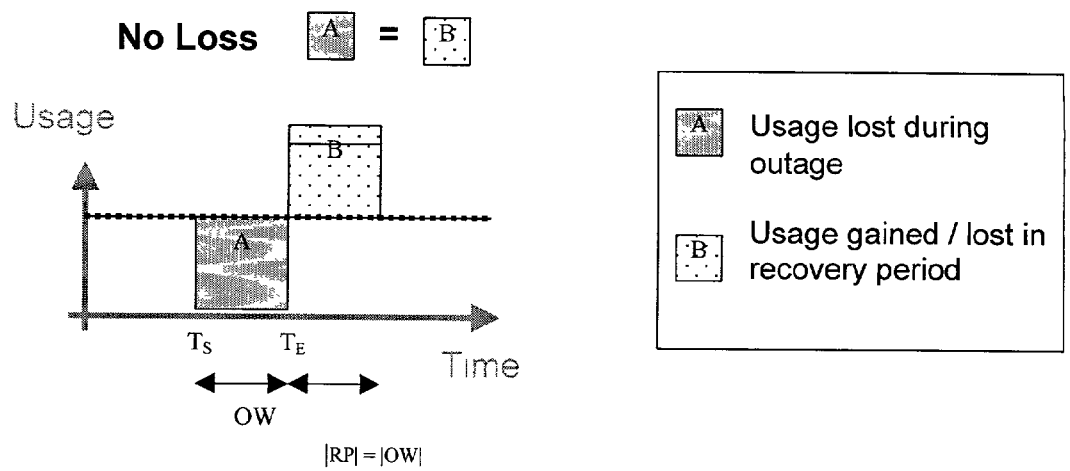
FIGS. 26-28 are graphical representations of exemplary usage loss scenarios for use in generating a usage loss curve in accordance with one embodiments of the present invention.

A first such usage pattern, a blip outage, has the characteristics of a short length outage, that usage lost during outage is regained post outage, and that users are typically unaware of the outage. An exemplary blip outage is a one minute POP3 outage, in which emails not served during the outage are served when the outage completes. FIG. 26 graphically represents this usage pattern, in which overshoot usage during recovery makes up for lost usage during the outage. This pattern may be defined by the rule that greater than 75% of the usage loss in the outage window is recovered within one outage window past end of outage. The usage loss during this usage pattern is zero, and the identification rule for this usage pattern is:

$$[S_{USAGE}(T_E, T_E+|OW|) - C_{USAGE}(T_E, T_E+|OW|)] > 0.75 * [C_{USAGE}(T_S, T_E) - S_{USAGE}(T_S, T_E)]$$

Figure 27:
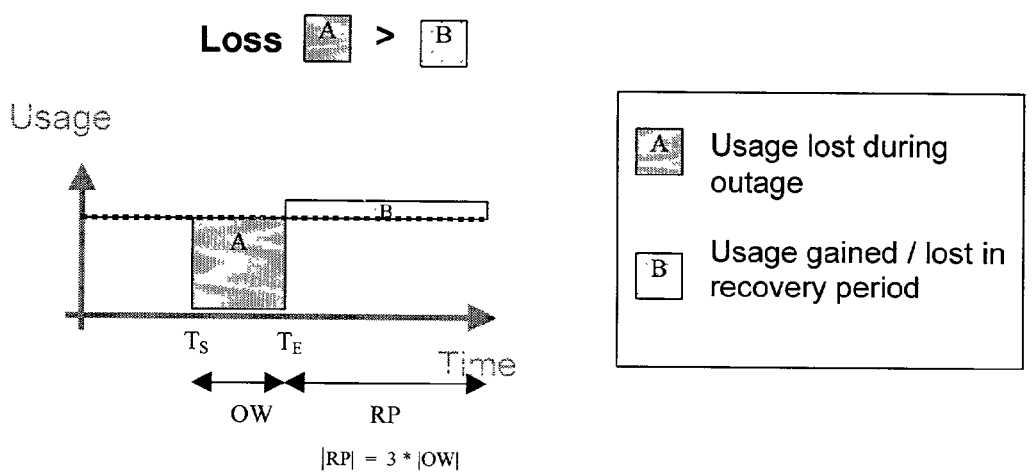

A second usage pattern, a loss outage, has the characteristics of a medium length outage in which usage that would have occurred during the outage period is not regained when outage ends, and that users are aware of the outage. An example of a loss outage is a one hour POP3 outage, during which the telephone is used as an alternative to email during outage period. The usage graph of a loss outage is shown in FIG. 27, in which the usage loss during the outage exceeds the usage gained during recovery. A loss usage may be defined as one in which less than 25% of the usage loss during outage is recovered within 3 outage windows past end of outage. The identification rule for this usage pattern is:

$$0 \leq [S_{USAGE}(T_E, T_E+3*|OW|) - C_{USAGE}(T_E, T_E+3*|OW|)] < 0.25 * [C_{USAGE}(T_S, T_E) - S_{USAGE}(T_S, T_E)]$$

The usage loss calculation is:

$$100*[S_{USAGE}(T_S, T_E+3*|OW|) - C_{USAGE}(T_S, T_E+3*|OW|)] / [C_{USAGE}(T_S, T_E) - S_{USAGE}(T_S, T_E)]$$

Figure 28:
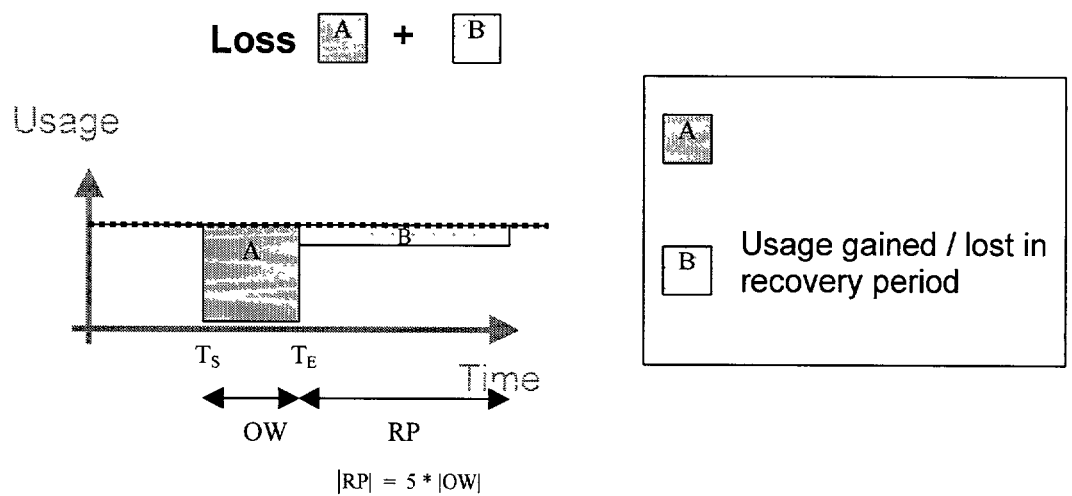

A third usage pattern, a suppressant outage, has the features of a long outage in which usage that would have occurred during the outage period is not regained when the outage ends, and usage does not return to pre-outage levels quickly after the outage, and in which a user's short term confidence in the service is lost and alternatives are sought. An example of a suppressant outage is a one day POP3 outage, in which the telephone is used as an alternative to email even when the outage ends. FIG. 28 graphs this usage pattern, showing that, usage continues to be below normal levels well after the outage has recovered. A suppressant outage may be characterized in that, for some value n, usage levels in each of the n subsequent outage window lengths past the end of the outage are less than 90% of the n corresponding comparison windows. A suitable value for n is 5.

The identification rule for a suppressant outage is:

for all $i \in \{0, 1, \ldots, n\}$, the following must hold true:

$$(S_{USAGE}(T_E+i*|OW|, T_E+(i+1)*|OW|) / (C_{USAGE}(T_E+i*|OW|, T_E+(i+1)*|OW|)) < 0.9$$

The usage loss percentage calculation is:

$$100*[C_{USAGE}(T_S, T_E+n*|OW|) - S_{USAGE}(T_S, T_E+n*|OW|)] / [C_{USAGE}(T_S, T_E) - S_{USAGE}(T_S, T_E)]$$

The level of customer retention component models the cost of an outage in terms of the long term loss of customers. This relationship is be represented by a function that linearly maps the percentage of existing customers lost to the outage length, the mapping being based upon historical or empirical data for the service or upon a relationship of number of customers lost to measured usage loss amount:

$$C_r(outage) = (customer\ lost) \times (cost\ per\ customer)$$

The service level agreement penalty component derives financial penalties based on the outage details. This financial penalty could be fixed ($x per outage), time linear ($x per minute of outage) or usage linear ($x per byte of usage missed).

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for analyzing a potential cause of a change in a service, wherein service quality of the service is monitored, usage of the service is measured, and service events are detected, the method comprising:
   determining a service change time window based at least in part upon a change in service quality between a first working state and a second, non-working state, and upon a change in service usage amount, the service change time window encompassing at least part of a service outage;
   retrieving data representing a plurality of detected events and a-corresponding times in which the events occurred;
   computing a probability for each of the detected events that each of the detected events caused the service change based at least in part on a correlation between the event time and the service change time window;
   determining whether one or more other events of a type identical to one of the detected events occurred;
   and wherein computing the probability comprises computing the probability using at least in part a false occurrence weighting function which decreases the probability of the detected event as the cause of the service change for instances in which the detected event occurred outside the service change time window.

2. The method of claim 1, wherein determining the service change time window comprises determining a service failure time window based upon the change in service quality and narrowing the service failure time window to the service change time window based upon the service usage amount measured during that service failure time window.

3. The method of claim 2, wherein the service quality is monitored through periodic polling of the service quality, and comprising determining the service failure time window as bounded by a polled point of the first working state and a polled point of the second, non-working state.

4. The method of claim 1, wherein computing the probability comprises computing the probability using at least in part a time weighting function which decreases exponentially with the distance between the event time and the service change time window.

5. The method of claim 1, comprising storing historical data associating occurrences of prior events with prior service changes, and wherein computing the probability that one of the detected events caused the service change comprises computing the probability based at least in part on the historical data.

6. The method of claim 5, wherein storing historical data comprises storing data representing instances in which prior events occurred within prior service change time windows, and wherein computing the probability that the detected event caused the service change comprises using at least in part a positive occurrence weighting function which increases the probability of the detected event as the cause of the service change based on instances in the historical data in which a prior event of a type identical to the detected event occurred within a prior service change time window.

7. The method of claim 5, wherein storing historical data comprises storing data representing instances in which prior events were identified as having caused prior service changes, and wherein computing the probability that the detected event caused the service change comprises using at least in part a historical weighting function which increases the probability of the detected event as the cause of the service change based on instances in the historical data in which a prior event of a type identical to the detected event was identified as having caused a prior service change.

8. The method of claim 1, wherein computing probabilities comprises computing the probabilities such that the total of all computed probabilities is 1.

9. The method of claim 1, wherein the service comprises service over a communication network and wherein the detected events include a network event.

10. The method of claim 1, wherein the service comprises service provided by an application program and wherein the detected events include comprises an application program event.

11. The method of claim 1, wherein the service change is a service outage, comprising determining the service change time window as a change in service quality from the first working state to the second, non-working state.

12. The method of claim 1, wherein the service change is a service recovery, comprising determining the service change time window as a change in service quality from the second, non-working state to the first, working state.

13. The method of claim 1, wherein determining the service change time window comprises detecting a change in service quality by detecting a step change in measured usage.

14. A method for analyzing potential causes of a service change, the method comprising: determining a service change time window encompassing a change of service between a first working state and a service outage, the service change being determined at least in part based on measured service usage levels; detecting occurrences of a set of events; retrieving data representing the plurality of detected events and corresponding times in which the events occurred, wherein the set of events are within a given time prior to and during the service change time window, each occurrence of an event being associated with a time at which the event occurred; computing a probability distribution for the set of events, which probability distribution determines for each event in the set the probability that the detected event caused the service change, the probability distribution being based at least in part on relations between the time of each event occurrence and the service change time window; and wherein computing the probability includes using two or more second functions selected from the group consisting of: a time weighting function which decreases exponentially the probability of a given event as the cause of the service change with the distance between the given event time and the service chance time window; a false occurrence weighting function which decreases the probability of a given event as the cause of the service change for instances in which events of the same type as the given event occurred outside the service change time window; a positive occurrence weighting function which increases the probability of a given event as the cause of the service change based on instances stored in a historical database in which events of the same type as the given event occurred within a prior service change time window; and a historical weighting function which increases the probability of a given event as the cause of the service change based on instances in the historical database in which events of the same type as the given event were identified as having caused a prior service outage.

15. The method of claim 14, wherein computing the probability distribution for the set of events comprises computing the probability distribution using a first weighting function which is the product of two or more second weighting functions.

16. The method of claim 14, wherein the step of computing the probability distribution comprises using a first weighting function which is the product of the time weighting function, false occurrence weighting function, positive occurrence weighting function, and user weighting function.

17. The method of claim 14, comprising monitoring service quality, and wherein determining the service change time window comprises determining a service failure time window based upon a change in monitored service quality and narrowing the service failure time window to the service change time window based upon the service usage amount measured during that service failure time window.

18. The method of claim 17, wherein the service quality is monitored through periodic polling of the service quality, and comprising determining the service failure time window as bounded by a polled point of the first working state and a polled point of the second, non-working state.

19. The method of claim 14, comprising computing the probability distribution such that the total of all probabilities in the distribution is 1.

20. The method of claim 14, wherein the service comprises service over a communication network and wherein the detected events comprise network events.

21. The method of claim 14, wherein the service comprises service provided by an application program and wherein the detected events comprise application program events.

22. The method of claim 14, wherein the service change is a service outage, comprising determining the service change time window as a change in service from the first working state to the second, non-working state.

23. The method of claim 14, wherein the service change is a service recovery, comprising determining the service change time window as a change in service from the second, non-working state to the first, working state.

24. The method of claim 14, wherein determining the service change time window comprises detecting a step change in measured usage.

25. A network monitoring system comprising: a service monitor for monitoring quality of service on the network; a usage meter for measuring usage of the network; an event detector for detecting a plurality of network events and corresponding times at which the network events occur; and a probable cause engine, coupled to receive data from the service monitor, usage meter, and the event detector, the probable cause engine including a processing device that, in response to executable instructions, is operative to: set setting a service change time window based upon data received from the service monitor or usage meter, the service change time window encompassing at least part of an occurrence of a service outage in the network; determine determining which of the network events detected by the event detector is the most likely cause of a service change including computing a probability for each of the detected events that each of the detected events caused the service change based at least in part on a correlation between the event time and service change time window; determining whether one or more other events of a type identical to one of the detected events occurred; and wherein computing the probability comprises computing the probability using at least in part a false occurrence weighting function which decreases the probability of the detected event as the cause of the service change for instances in which the detected event occurred outside the service change time window.

26. A computer readable medium storing program code for, when executed, causing a computer to perform a method for analyzing a potential cause of a an change in a service, wherein service quality of the service is monitored, usage amount of the service is measured, and service events are detected, the method comprising: determining a service change time window based at least in part upon a change in service quality between a first working state and a second, non-working state, and upon a change in service usage amount, the service change time window encompassing at least part of a service outage; retrieving data representing a plurality of detected events and a-corresponding times in which the events occurred; computing a probability for each of the detected events that each of the detected events caused the service change based at least in part on a correlation between the event time and the service change time window; determining whether one or more other events of a type identical to one of the detected events occurred; and wherein computing the probability comprises computing the probability using at least in part a false occurrence weighting function which decreases the probability of the detected event as the cause of the service change for instances in which the detected event occurred outside the service change time window.

27. Computer readable media comprising program code that, when executed by a programmable microprocessor, causes the programmable microprocessor to execute a method for analyzing potential cause of a service change, the method comprising: determining a service change time window encompassing a change of service between a first working state and a service outage, the service change being determined at least in part based on measured service usage levels; detecting occurrences of a set of events; retrieving data representing the plurality of detected events and corresponding times in which the events occurred, wherein the set of events are within a given time prior to and during the service change time window, each occurrence of an event being associated with a time at which the event occurred; computing a probability distribution for the set of events, which probability distribution determines for each event in the set the probability that the detected event caused the service change, the probability distribution being based at least in part on relations between the time of each event occurrence and the service change window; wherein computing the probability includes using two or more second functions selected from the group consisting of: a time weighting function which decreases the probability of a given event as the cause of the service change with the distance between the given event time and the service change time window; a false occurrence weighting function which decreases the probability of a given event as the cause of the service change for instances in which events of the same type as the given event occurred outside the service change time window; a positive occurrence weighting function which increases the probability of a given event as the cause of the service change based on instances stored in a historical database in which events of the same type as the given event occurred within a prior service change time window; and a historical weighting function which increases the probability of a given event as the cause of the service change based on instances in the historical database in which events of the same type as the given event were identified as having caused a prior service outage.

28. The computer readable media comprising program code of claim 27 that, when executed by a programmable microprocessor, causes the programmable microprocessor to execute a method for analyzing potential cause of a service change; wherein computing the probability distribution for the set of event comprises computing the probability distribution using a first weighting function which is the product of two or more second weighting functions.

29. The computer readable media comprising program code of claim 27 that, when executed by a programmable microprocessor, causes the programmable microprocessor to execute a method for analyzing potential cause of a service change, the method comprising monitoring service quality, an wherein determining the service change time window comprises determining a service failure time window based upon a change in monitored service quality and narrowing the service failure time window to the service change time window based upon the service usage amount measured during the service failure time window.

30. The computer readable media comprising program code of claim 27 that, when executed by a programmable microprocessor, causes the programmable microprocessor to execute a method for analyzing potential cause of a service change, the method comprising computing the probability distribution such that the total of all probabilities in the distribution is 1.

31. The computer readable media comprising program code of claim 27 that, when executed by a programmable microprocessor, causes the programmable microprocessor to execute a method for analyzing potential cause of a service change, wherein the service comprises service over a communication network and wherein the detected events comprise network events.

32. The computer readable media comprising program code of claim 27 that, when executed by a programmable microprocessor, causes the programmable microprocessor to execute a method for analyzing potential cause of a service change, wherein the service comprises service provided by an application program and wherein the detected events comprise application program events.

33. The computer readable media comprising program code of claim 27 that, when executed by a programmable microprocessor, causes the programmable microprocessor to execute a method for analyzing potential cause of a service change, wherein the service change is a service outage, comprising determining the service change time window as a change in service from the first working state to the second, non-working state.

* * * * *